(12) United States Patent
Weisse et al.

(10) Patent No.: US 11,853,515 B2
(45) Date of Patent: Dec. 26, 2023

(54) ULTRA-THIN TOUCH SENSORS

(71) Applicant: Apple Inc., Cupertino, CA (US)

(72) Inventors: Jeffrey M. Weisse, Santa Clara, CA (US); Chun-Hao Tung, Santa Clara, CA (US); Ji Hun Choi, Los Gatos, CA (US); Wenqing Dai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/712,339

(22) Filed: Dec. 12, 2019

(65) Prior Publication Data

US 2020/0201482 A1  Jun. 25, 2020

Related U.S. Application Data

(60) Provisional application No. 62/782,264, filed on Dec. 19, 2018.

(51) Int. Cl.
*G06F 3/041* (2006.01)
*G06F 3/044* (2006.01)

(52) U.S. Cl.
CPC ........ *G06F 3/0443* (2019.05); *G06F 3/04166* (2019.05); *G06F 2203/04102* (2013.01)

(58) Field of Classification Search
CPC ......... G09G 3/3648; G09G 2310/0264; G09G 2320/0252; G09G 2360/04; G09G 2360/18; G09G 2370/08; G06F 3/041
See application file for complete search history.

(56) References Cited

U.S. PATENT DOCUMENTS

| | | | |
|---|---|---|---|
| 5,876,427 | A  | 3/1999  | Chen et al. |
| 8,026,903 | B2 | 9/2011  | Hamblin et al. |
| 8,358,276 | B2 | 1/2013  | Hotelling et al. |
| 8,549,738 | B2 | 10/2013 | Grunthaner |

(Continued)

FOREIGN PATENT DOCUMENTS

| | | |
|---|---|---|
| CN | 202281986 U  | 6/2012 |
| CN | 103260334 A  | 8/2013 |

(Continued)

OTHER PUBLICATIONS

Final Office Action received for U.S. Appl. No. 16/661,847, dated Dec. 8, 2020, 16 pages.

(Continued)

*Primary Examiner* — Michael A Faragalla
(74) *Attorney, Agent, or Firm* — Kubota & Basol LLP

(57) ABSTRACT

Touch screens with ultra-thin stack-ups can provide for a lower profile device, can improve the optical image on the display by reducing the display to cover glass distance, and can reduce the weight of the device. In some examples, the thickness of the touch screen stack-up can be reduced and/or the border region reduced, by removing the flex circuit connection from the stack-up. A flexible substrate can be used to enable routing of touch electrodes to touch circuitry. In some examples including a shield layer, the thickness of the touch screen stack-up can be reduced by routing the shield layer to a shield electrode on the touch sensor panel. The shield layer can then be routed to touch sensing circuitry via the flexible substrate. In some examples, the touch sensor panel or a portion of thereof can be integrated with the polarizer.

20 Claims, 15 Drawing Sheets

(56) References Cited

U.S. PATENT DOCUMENTS

| | | | |
|---|---|---|---|
| 8,693,202 | B2 | 4/2014 | Yoshifusa |
| 8,730,179 | B2 | 5/2014 | Rosenblatt et al. |
| 9,084,357 | B2 | 7/2015 | Shedletsky et al. |
| 9,160,332 | B2 | 10/2015 | Guard |
| 9,235,286 | B2 | 1/2016 | Nakano et al. |
| 9,515,128 | B2 | 12/2016 | Kang et al. |
| 9,658,490 | B2 * | 5/2017 | Kao .................. G02F 1/133502 |
| 9,874,961 | B2 | 1/2018 | Chaturvedi et al. |
| 9,939,973 | B2 | 4/2018 | Kim et al. |
| 9,939,978 | B2 | 4/2018 | Chen et al. |
| 10,025,356 | B2 | 7/2018 | Kang et al. |
| 10,054,988 | B2 * | 8/2018 | Jin .................. G06F 1/1626 |
| 10,403,703 | B2 | 9/2019 | Yamazaki |
| 10,658,450 | B2 * | 5/2020 | Chen .................. G02F 1/133308 |
| 2002/0008809 | A1 | 1/2002 | Babuka et al. |
| 2008/0158181 | A1 | 7/2008 | Hamblin et al. |
| 2009/0283300 | A1 | 11/2009 | Grunthaner |
| 2010/0302201 | A1 | 12/2010 | Ritter et al. |
| 2011/0094670 | A1 | 4/2011 | Grunthaner |
| 2011/0279409 | A1 | 11/2011 | Salaverry et al. |
| 2013/0021297 | A1 | 1/2013 | Lee |
| 2013/0088671 | A1 | 4/2013 | Drzaic et al. |
| 2014/0145977 | A1 | 5/2014 | Kang |
| 2014/0192277 | A1 * | 7/2014 | Yilmaz .................. G02B 1/04 349/12 |
| 2014/0375907 | A1 | 12/2014 | Wu |
| 2015/0160760 | A1 | 6/2015 | Sato |
| 2015/0162388 | A1 | 6/2015 | Kim |
| 2015/0234486 | A1 | 8/2015 | Huang et al. |
| 2015/0241906 | A1 | 8/2015 | Tsai et al. |
| 2016/0011689 | A1 | 1/2016 | Kim et al. |
| 2016/0054825 | A1 | 2/2016 | Fried |
| 2016/0155967 | A1 * | 6/2016 | Lee .................. G06F 3/0445 257/88 |
| 2016/0204366 | A1 | 7/2016 | Zhang et al. |
| 2016/0370827 | A1 | 12/2016 | Jin et al. |
| 2017/0048990 | A1 | 2/2017 | Sim et al. |
| 2017/0064826 | A1 | 3/2017 | Park et al. |
| 2017/0090661 | A1 * | 3/2017 | Kim .................. G06F 3/0412 |
| 2017/0154842 | A1 | 6/2017 | Manusharow et al. |
| 2017/0170255 | A1 | 6/2017 | Ha et al. |
| 2017/0269737 | A1 | 9/2017 | Zou et al. |
| 2017/0336831 | A1 | 11/2017 | Zhang et al. |
| 2017/0371441 | A1 | 12/2017 | Heikkinen et al. |
| 2018/0032184 | A1 | 2/2018 | Huang et al. |
| 2018/0157354 | A1 | 6/2018 | Blondin et al. |
| 2018/0232554 | A1 | 8/2018 | Benkley et al. |
| 2018/0342568 | A1 | 11/2018 | Jin et al. |
| 2019/0011754 | A1 | 1/2019 | Chen |
| 2019/0035869 | A1 * | 1/2019 | Kim .................. H01L 51/0097 |
| 2019/0102011 | A1 | 4/2019 | Schultz et al. |
| 2019/0204669 | A1 | 7/2019 | Lee et al. |
| 2019/0369761 | A1 | 12/2019 | Guard et al. |
| 2020/0142540 | A1 | 5/2020 | Rahmani et al. |
| 2020/0142542 | A1 | 5/2020 | Kuriki et al. |

FOREIGN PATENT DOCUMENTS

| | | |
|---|---|---|
| CN | 103440066 A | 12/2013 |
| CN | 106066728 A | 11/2016 |
| CN | 107491221 A | 12/2017 |
| JP | 2003-248441 A | 9/2003 |
| JP | 2012-18634 A | 1/2012 |
| JP | 2014-149608 A | 8/2014 |
| KR | 10-2004-0048695 A | 6/2004 |
| KR | 10-2008-0046371 A | 5/2008 |
| KR | 10-0871329 B1 | 12/2008 |
| KR | 10-2012-0131876 A | 12/2012 |
| KR | 10-1365960 B1 | 2/2014 |
| KR | 10-2017-0039004 A | 4/2017 |
| KR | 10-2017-0041807 A | 4/2017 |
| KR | 10-2018-0077625 A | 7/2018 |
| WO | 2014/134894 A1 | 9/2014 |
| WO | 2016/055897 A1 | 4/2016 |

OTHER PUBLICATIONS

International Search Report received for PCT Patent Application No. PCT/CN2020/134899, dated May 27, 2021, 6 pages.

Non-Final Office Action received for U.S. Appl. No. 16/661,847, dated Jun. 11, 2020, 14 pages.

Notice of Allowance received for U.S. Appl. No. 16/661,847, dated May 13, 2021, 10 pages.

Search Report received for Chinese Patent Application No. 201911052197.2, dated Dec. 27, 2022, 6 pages (3 pages of English Translation and 3 pages of Official Copy).

Search Report received for Chinese Patent Application No. 201911052197.2, dated May 22, 2023, 4 pages (2 pages of English Translation and 2 pages of Official Copy).

Search Report received for Chinese Patent Application No. 201911279947.X, dated Jan. 20, 2023, 6 pages (3 pages of English Translation and 3 pages of Official Copy).

\* cited by examiner

ULTRA-THIN TOUCH SENSORS

CROSS-REFERENCE TO RELATED APPLICATIONS

This application claims the benefit under 35 USC 119(e) of U.S. Provisional Patent Application No. 62/782,264, filed Dec. 19, 2018 the contents of which are incorporated herein by reference in their entirety for all purposes.

FIELD OF THE DISCLOSURE

This relates generally to touch screens, and more particularly, to touch screens with ultra-thin stack-ups.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates to touch screens with ultra-thin stack-ups. Reducing the thickness of the touch screen can provide for a lower profile device, can improve the optical image on the display by reducing the display to cover glass distance, and can reduce the weight of the device. In some examples, the thickness of the touch screen stack-up can be reduced and/or the border region reduced, by removing the flex circuit connection from the stack-up. A flexible substrate can be used to enable routing of touch electrodes to touch circuitry. In some examples, the touch screen stack-up can include a shield layer between the touch sensor panel and the display. In some examples, the thickness of the touch screen stack-up including a shield layer can be reduced by routing the shield layer to a shield electrode on the touch sensor panel. The shield layer can then be routed to touch sensing circuitry via the flexible substrate. Additionally, or alternatively, in some examples, as described herein, the touch sensor panel or a portion of thereof can be integrated with the polarizer. Integrating the touch sensor panel with the polarizer can reduce the thickness of the touch screen stack-up because one substrate can be used for the touch sensor panel and polarizer in place of separate substrates for each of the touch sensor panel and the polarizer.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch screens with ultra-thin stack-ups. Reducing the thickness of the touch screen can provide for a lower profile device, can improve the optical image on the display by reducing the display to cover glass distance, and can reduce the weight of the device. In some examples, the thickness of the touch screen stack-up can be reduced and/or the border region reduced, by removing the flex circuit connection from the stack-up. A flexible substrate can be used to enable routing of touch electrodes to touch circuitry.

In some examples, the touch screen stack-up can include a shield layer between the touch sensor panel and the display. In some examples, the thickness of the touch screen stack-up including a shield layer can be reduced by routing the shield layer to a shield electrode on the touch sensor panel. The shield layer can then be routed to touch sensing circuitry via the flexible substrate.

Additionally, or alternatively, in some examples, as described herein, the touch sensor panel or a portion of thereof can be integrated with the polarizer. Integrating the touch sensor panel with the polarizer can reduce the thickness of the touch screen stack-up because one substrate can be used for the touch sensor panel and polarizer in place of separate substrates for each of the touch sensor panel and the polarizer.

Figure 1A:
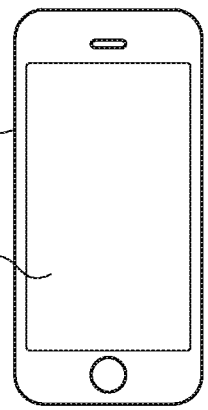
FIGS. 1A-1E illustrate example systems that can include touch screens with ultra-thin stack-ups according to examples of the disclosure.
Figure 1B:
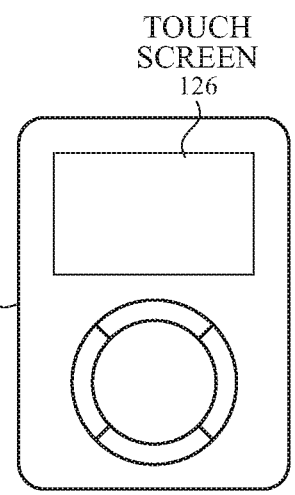
Figure 1C:
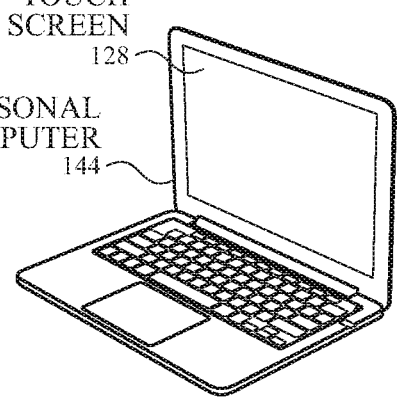
Figure 1D:
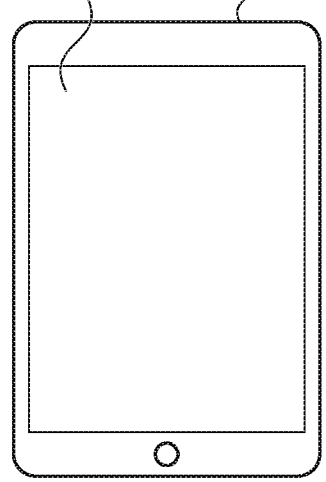
Figure 1E:
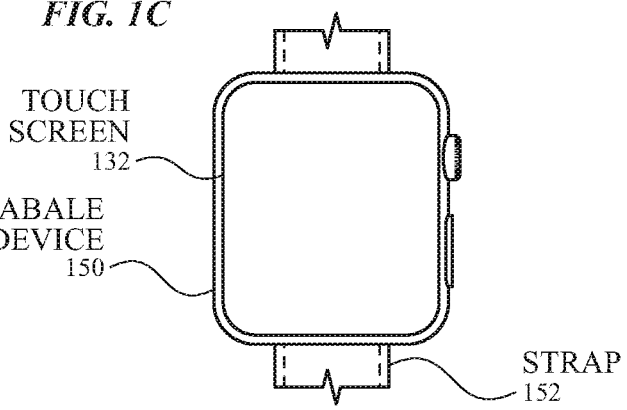

FIGS. 1A-1E illustrate example systems that can include touch screens with ultra-thin stack-ups according to examples of the disclosure. FIG. 1A illustrates an example mobile telephone 136 that includes a touch screen 124 that can be implemented with ultra-thin stack-ups according to examples of the disclosure. FIG. 1B illustrates an example digital media player 140 that includes a touch screen 126 that can be implemented with ultra-thin stack-ups according to examples of the disclosure. FIG. 1C illustrates an example personal computer 144 that includes a touch screen 128 that can be implemented with ultra-thin stack-ups according to examples of the disclosure. FIG. 1D illustrates an example tablet computing device 148 that includes a touch screen 130 that can be implemented with ultra-thin stack-ups according to examples of the disclosure. FIG. 1E illustrates an example wearable device 150 that includes a touch screen 132 and can be attached to a user using a strap 152 and that can be implemented with ultra-thin stack-ups according to examples of the disclosure. It is understood that a touch screen with ultra-thin stack-ups can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
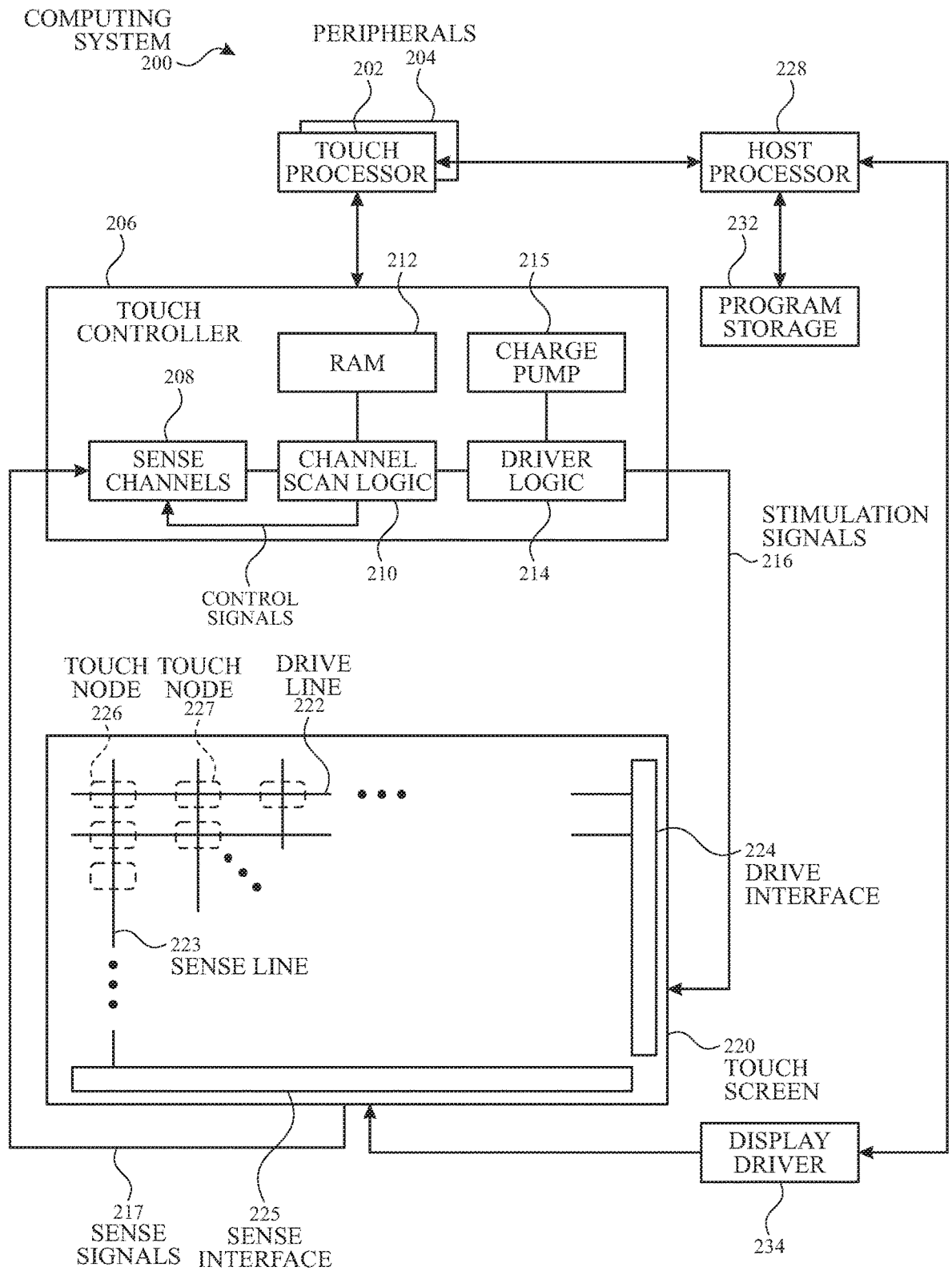
FIG. 2 illustrates an example computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver or more generally, display driver 234. It is understood that although some examples of the disclosure are described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. The display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
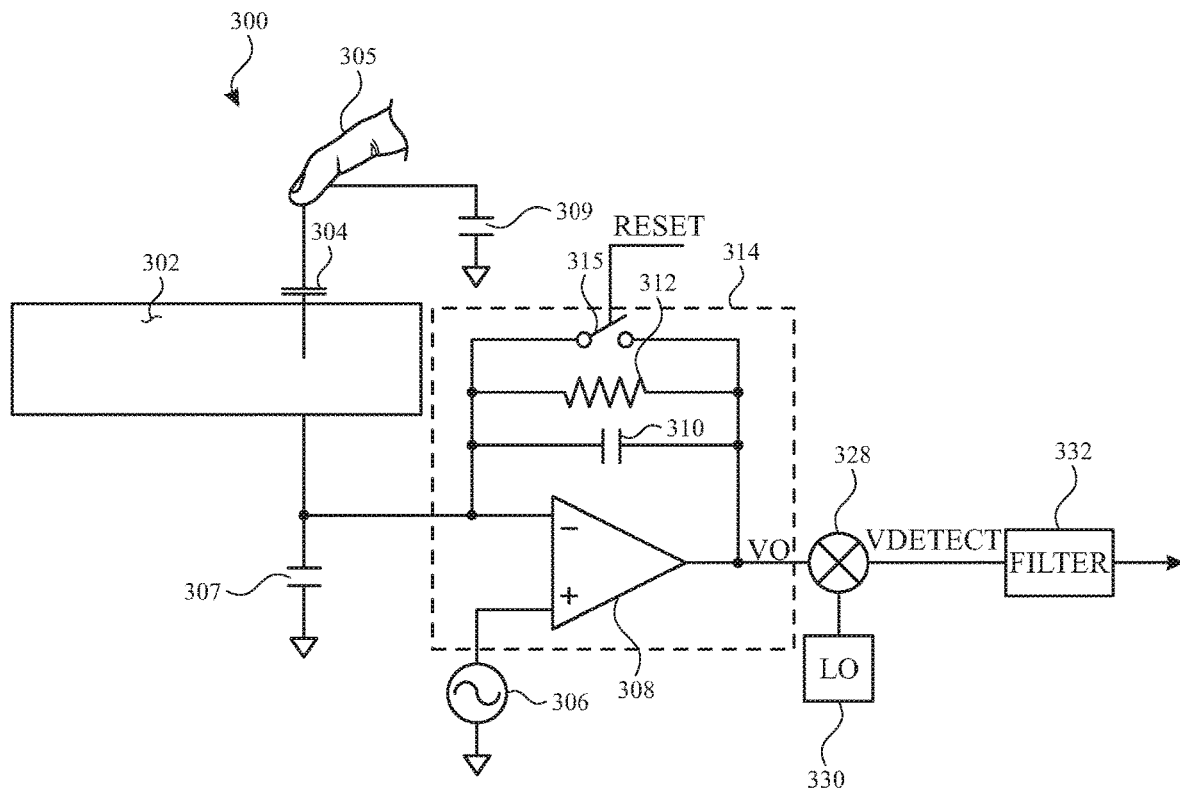
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
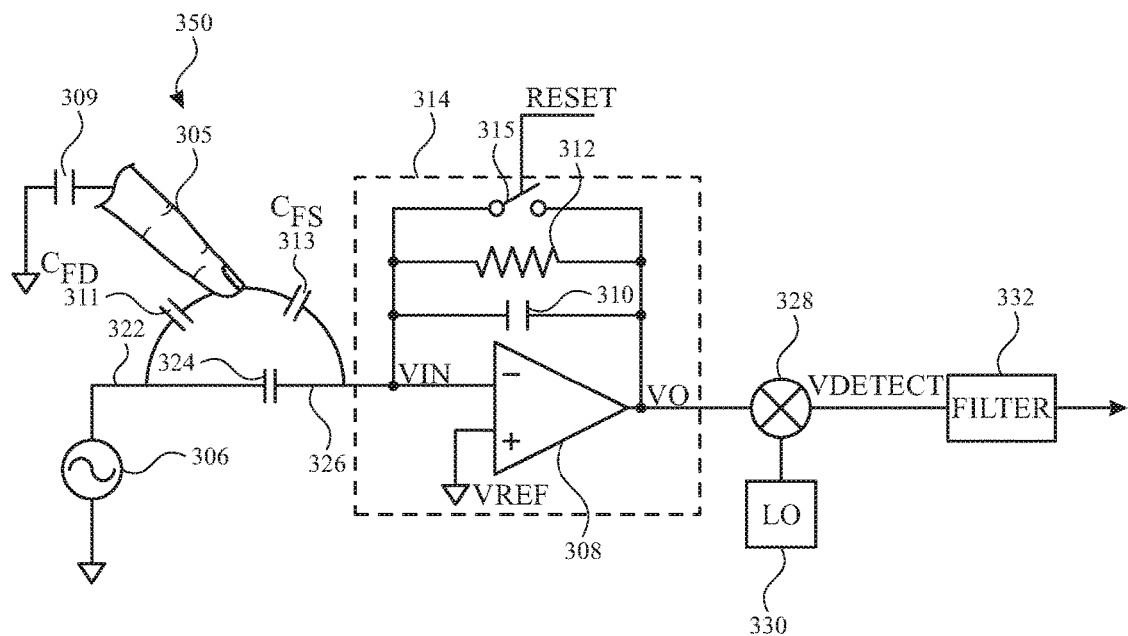
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage $V_o$ to keep $V_{in}$ substantially equal to Vref, and can therefore maintain yin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
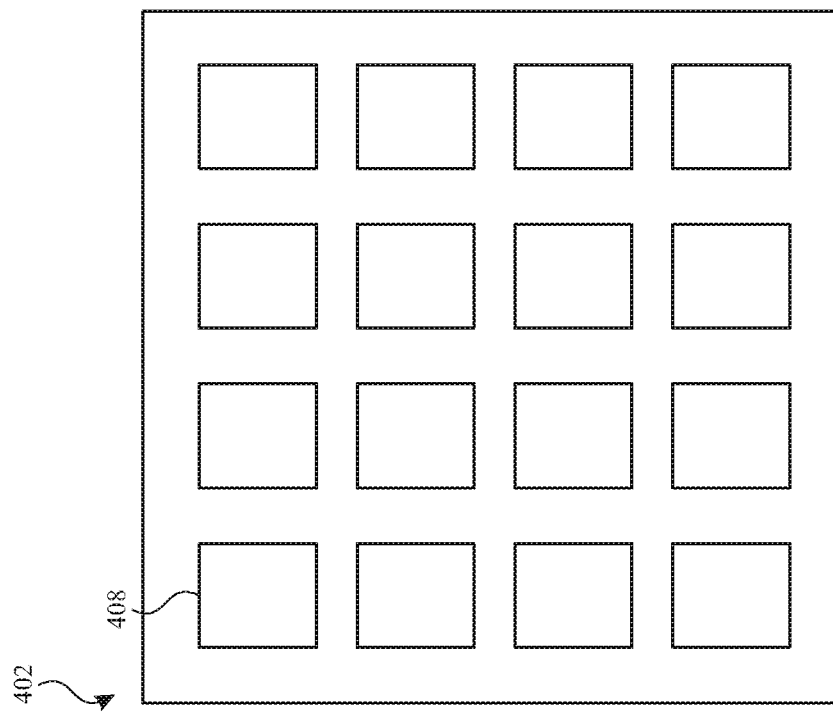
FIG. 4B illustrates a touch screen with touch node electrodes arranged in a pixelated touch node electrode configuration according to examples of the disclosure.
Figure 4A:
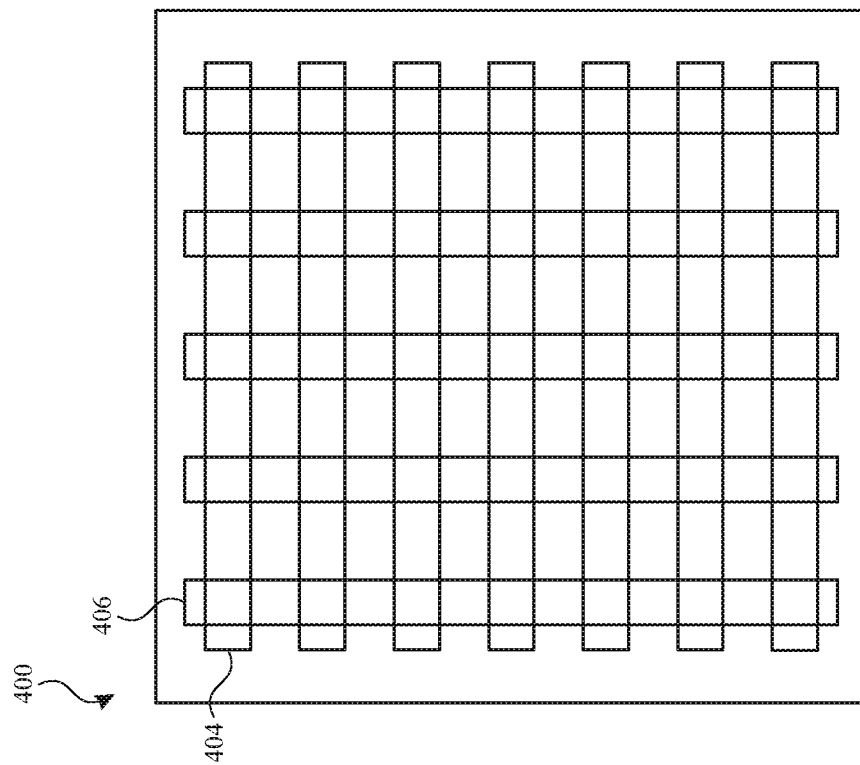
FIG. 4A illustrates a touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. In some examples, the conductive plates can be formed from other materials including conductive polymers, metal mesh, graphene, nanowires (e.g., silver nanowires) or nanotubes (e.g., carbon nanotubes). Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 5A:
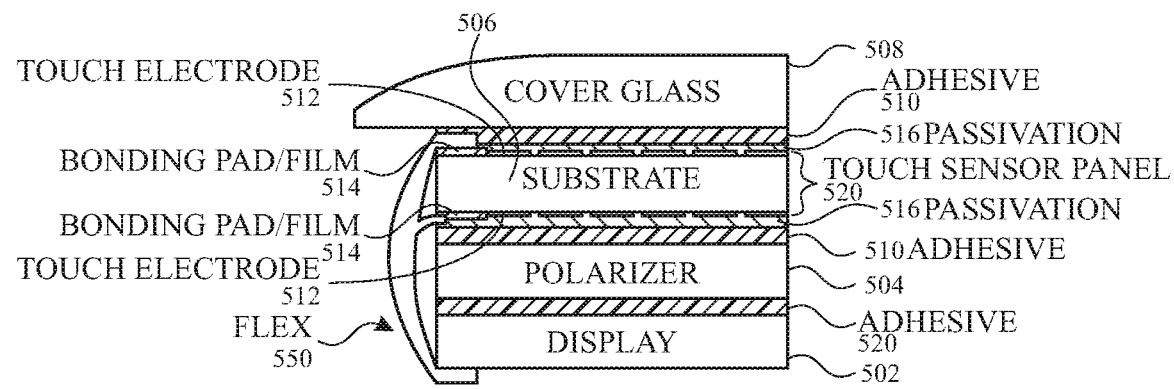
FIG. 5A illustrates an exemplary touch screen that can be used in a touch sensitive device according to examples of the disclosure.

FIG. 5A illustrates an exemplary touch screen that can be used in a touch sensitive device, such as a mobile phone, tablet, touchpad, portable computer, portable media player, wearable device or the like, according to examples of the disclosure. Touch screen 500 can include a stack-up including a display 502, a polarizer 504, a touch sensor panel 520 and a cover glass 508 (also referred to as front crystal). Display 502 can generate an image on the touch screen. Polarizer 504 can be used to control the brightness of light emitted from the display 502. Cover glass 508 can be used as the outermost layer of the touch screen to protect components of the touch screen. Touch sensor panel 520 can be formed from rows and columns of transparent conductive material 512 (touch electrodes) patterned on opposite sides of a dielectric, such as transparent plastic substrate 506. It should be understood that although the representation of conductive material 512 gives an appearance in a cross-sectional view of FIG. 5A of electrodes having the same orientation on both sides of substrate 506 (for simplicity of illustration), that the rows and columns on opposite sides of substrate 506 can be perpendicular in a row-column pattern (e.g., as described above with respect to FIG. 4B). Touch sensor panel 520 can also include passivation layers 516 disposed over the transparent conductive material 512. The transparent plastic substrate 506 can act as a dielectric layer between the rows and columns of transparent conducting material 512. The crossing points between rows and columns of conductive material, separated by the dielectric, can form sensing regions or nodes (e.g., as described above with respect to FIG. 4A). Although a double-sided row-column pattern is shown in FIG. 5A, other patterning is possible. For example, the electrodes can be patterned on one side in a row-column pattern using bridges or in a pixelated pattern (e.g., as described above with respect to FIG. 4B). The transparent plastic substrate can be made from different materials such as cylco olefin polymer (COP), polyethylene terephthalate (PET), polycarbonate (PC), clear polyimide (CPI) or the like. The transparent conducting material can be indium tin oxide (ITO) or silver nanowire (AgNW), for example. Display 502, polarizer 504, touch sensor panel 520 and cover glass 508 can be coupled (e.g., laminated together) by optically clear adhesive (OCA) layers 510.

Figure 5B:
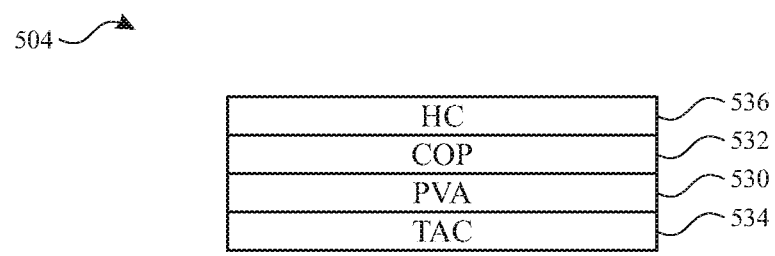
FIG. 5B illustrates an exemplary polarizer stack-up according to examples of the disclosure.

FIG. 5B illustrates an exemplary polarizer stack-up according to examples of the disclosure. Polarizer 504 can include a polarizing layer, such as a polyvinyl alcohol (PVA) film 530 doped with iodine. Although examples in the disclosure refer to PVA film doped with iodine, it should be understood that polarizing layer is not limited to PVA film doped with iodine, and any suitable polarizing material can be used. The polarizer PVA film 530 can be disposed between substrate layers 532, 534 to protect the PVA film 530. The substrate layers can be made from materials including COP, PC, acrylic, triacetyl cellulose (TAC) or the like. Polarizer 504 can also include additional protective layers including a hard coat layer 536 disposed on substrate 532, and one or more wave plate (retarder) coating layers, such as a half wave plate and/or a quarter wave plate (not shown). The PVA film, the various substrates, protective layers and wave plate layers can be coupled via a lamination process using adhesives (not shown). In some examples, the PVA film 530 can be 5-35 µm and the substrate layers can be between 15-50 µm.

Referring back to FIG. 5A, in some examples, the touch electrodes (conductive material 512) can be routed to touch sensing circuitry (e.g., touch controller 206) outside the visible area of the touch screen (e.g., disposed beneath display 502). For example, FIG. 5A illustrates a flexible printed circuit (FPC) 550 (also referred to herein as "flex circuit") that can be coupled to touch sensor panel 520. In some examples, the coupling can be via a bonding pad or conductive film 514 (e.g., anisotropic conductive film (ACF)). As shown in FIG. 5A the flex circuit 550 can include one or multiple tabs to couple to one or more different sides of the touch sensor panel 520. The number of tabs can depend on the pattern of conductive material forming the touch electrodes and on the routing of the touch electrodes to the edges of substrate 506. In some examples, the touch electrodes on one side of substrate 506 (e.g., rows) can be routed to one side of the touch sensor panel and touch electrodes on another side of substrate 506 (e.g., columns) can be routed to a different side of the touch sensor panel. In such an example, two flex circuit tabs may be used. In some examples, more or fewer flex circuits may be used.

The flex circuit 550 connection to touch sensor panel 520, however, can increase the thickness of touch screen stack-up 500. Additionally, connecting the flex circuit 550 to touch sensor panel 520 can require a border region around the active touch and display region of the touch screen that may not be used for display and/or touch sensing. In some examples, as described herein, the thickness of the touch screen stack-up can be reduced and/or the border region reduced, by removing the flex circuit from the stack-up. Instead, in some examples, the touch sensor panel can be formed using a flexible substrate (e.g., replacing a single-layer rigid substrate in the stack-up with a flexible substrate). The touch electrodes can be routed from the touch sensor panel to the touch sensing circuitry using the flexible substrate rather than a flexible printed circuit. Reducing the thickness of the touch screen can provide for a lower profile device and can reduce the weight of the device. Additionally, reducing the display to cover glass distance can improve the optical image on the display and/or can reduce mechanical strain during bending of the touch screen.

Although not illustrated in FIG. 5A, in some examples, a touch screen stack-up can include a shield layer between the touch sensor panel and the display to reduce interference between the touch and display systems. In some examples, routing the shield layer can also require a flex circuit (or another tab of an existing flex circuit). In some examples, as described herein, the thickness of the touch screen stack-up including a shield layer can be reduced by routing the shield layer to a shield electrode on the touch sensor panel. The shield layer (via the shield electrode) can then be routed to touch sensing circuitry (e.g., touch controller 206) via the flexible substrate of the touch sensor panel.

Additionally or alternatively, in some examples, as described herein, the touch sensor panel 520 or a portion of thereof can be integrated with polarizer 504. Integrating the touch sensor panel 520 with the polarizer 504 can reduce the thickness of the touch screen stack-up because one substrate can be used in place of transparent plastic substrate 506 of the touch sensor panel and substrate 532 of the polarizer. Reducing the thickness of the touch screen also provides the added benefit of reducing the weight of the device. Additionally, reducing the display to cover glass distance can improve the optical image on the display and/or can reduce mechanical strain during bending of the touch screen.

Figure 6A:
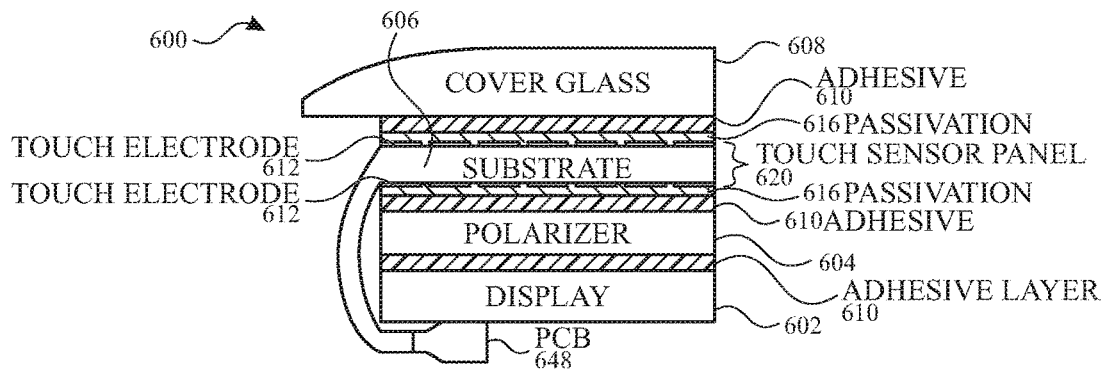
FIGS. 6A-6D illustrate examples of touch screen stack-ups with a flexible substrate according to examples of the disclosure.
Figure 6B:
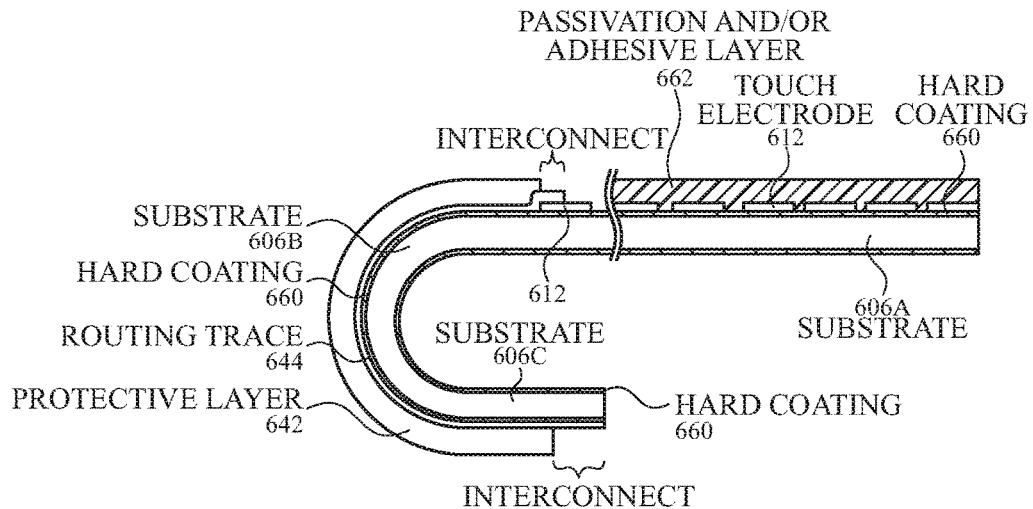
Figure 6C:
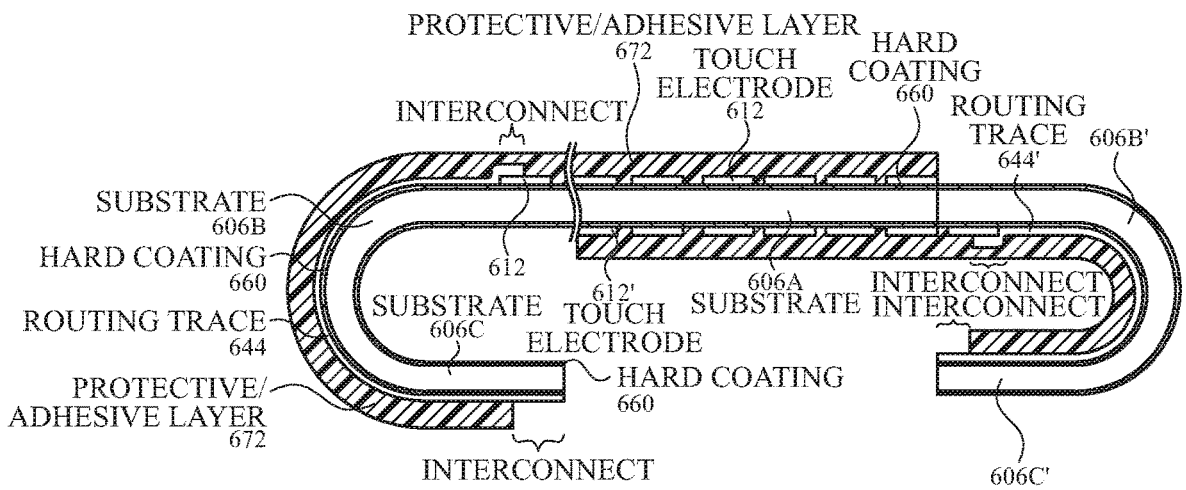
Figure 6D:
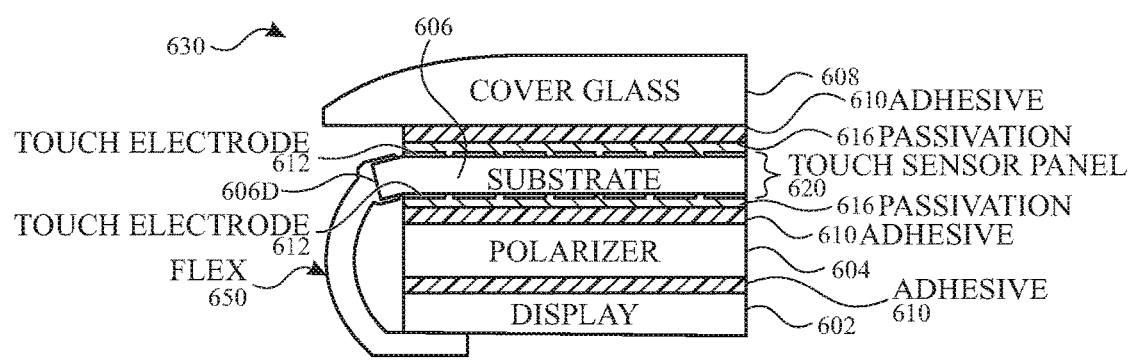

FIGS. 6A-6D illustrate examples of touch screen stack-ups with a flexible substrate according to examples of the disclosure. In some examples, as shown in FIGS. 6A-6C, the stack-up can include a flexible substrate configured to flex from the touch sensor panel around to an opposite side of the display (wrap-around). In some examples, the stack-up may not include a full wrap-around, but may include a flexible substrate which extends, at least partially, beyond the visual area of the touch screen (beyond the display/touch electrode area of the stack-up). For example, FIG. 6D shows a short tab extending from the stack-up for connection to a flex circuit. The latter implementation can remove the flex circuit from the stack-up (thereby reducing the height of the stack-up) without requiring as much flexibility from the substrate as a full wrap-around shown in FIGS. 6A-6C.

FIG. 6A illustrates touch screen 600 can include a display 602, a polarizer 604, a touch sensor panel 620 (e.g., including touch electrodes 612, passivation layers 616 disposed on substrate 606), a cover glass 608 and one or more adhesive layers 610. Touch screen 600 can be similar to touch screen 500, and some differences will be described below for ease of description. Unlike FIG. 5A with a rigid/planar substrate 606 in the stack-up and a flex circuit 550 to connect touch sensor panel 520 with touch sensing circuitry, touch sensor panel 620 can connect with touch sensing circuitry without including a flex circuit connection in the stack-up. Instead, touch sensor panel 620 of touch screen 600 can include a substrate 606 formed with a flexible material. A portion of the substrate within the stack-up (labeled 606A in FIG. 6B) can be planar due to its placement within the stack-up (which may include other rigid layers). A portion of the substrate outside of the stack-up (labeled 606B in FIG. 6B) can be non-planar and flexible to bend from the touch sensor panel 620 to below the display 602. In some examples, a portion of the substrate (labeled 606C in FIG. 6B) can be planar due to its placement below display 602. The flexible substrate 606 can route the touch electrodes of touch screen 620 to touch sensing circuitry below display 602 (e.g., on a printed circuit board (PCB) 648). Although FIG. 6A shows the polarizer below the touch sensor panel, in some examples, the polarizer can be disposed above the touch sensor panel.

FIG. 6B illustrates additional details of the example of the wrap-around flexible substrate of touch screen 600 of FIG. 6A. The substrate illustrated in FIG. 6B can be formed of a flexible material such as CPI, COP (e.g., partially crystallized and partially amorphous), or PET. The flexibility provided by flexible materials can enable bending of the substrate (e.g., portion 606B of the substrate). In some examples, as shown in FIGS. 6A-6B, for example, the bending of portion 606B of the substrate can provide for 180 degrees of bending between substantially planar portions 606A and 606C of the substrate. The planar portion 606A can include touch electrodes 612 of the touch sensor panel and can be disposed above the display of the touch screen. The planar portion 606A can also include a passivation layer 662 (e.g., corresponding to passivation layer 616) above touch electrodes 612. In some examples, to reduce the stack-up thickness, passivation layer 662 can be formed using a material with both adhesive and passivation properties such that the stack-up does not need to include both the adhesive layer above the touch sensor panel (e.g., corresponding to adhesive layer 610) and a separate passivation layer (e.g., corresponding to passivation layer 616). The planar portion 606C can be disposed below the display of the touch screen (outside the visible area). In some examples, the substrate can include a protective coating (e.g., hard coating 660) which can improve performance for bending of the substrate. In some examples, hard coating 660 may be replaced (or augmented) with a coating layer (not necessarily hard) to provide for improved adhesion and/or for chemical compatibility for deposition of touch electrodes.

As described above with respect to FIG. 6A, the flexible substrate 606 can route the touch electrodes of touch screen 620 to touch sensing circuitry below display 602. For example, the flexible substrate can include routing 644 to route touch electrodes 612 from the touch sensor panel 620 to the touch sensing circuitry. As shown in FIG. 6B, the routing 644 can be flexible and can be disposed on portion 606B of the substrate. The routing 644 can be electrically coupled to touch electrodes 612 at a first interconnection interface (e.g., on portion 606A of the substrate). The routing 644 can be electrically coupled to the touch sensing circuitry (not shown) via a second interconnection interface (e.g., on portion 606C of the substrate). Additionally, a protective coating 642 can be included to prevent corrosion and/or to provide mechanical stability for routing 644 and the flexible substrate 606.

For ease of description, FIG. 6B illustrates touch electrodes 612 on one side of substrate 606A, but it is understood that for double-sided touch sensor panels (e.g., such as the double-sided touch sensor panel 620 in FIG. 6A), additional touch electrodes 612 can be disposed and routed via the flexible substrate. For example, touch electrodes 612 on the opposite side of the flexible substrate (shown in FIG. 6A, but not shown in FIG. 6B) can be routed from portion 606A to 606B to 606C of the substrate (e.g., along the inner portion of the flexible substrate in portion 606B shown in FIG. 6B). In some examples, the touch electrodes 612, hard coating 660, routing trace 644 and/or protective layer 642 can be mirrored on the second side of substrate 606 for such a stack-up.

In some examples, the touch electrodes on the second, opposite side of the substrate can be routed via a wrap-around bend at another edge of the touch sensor panel. For example, FIG. 6C illustrates additional details of an example of the flexible substrate of touch screen 600 of FIG. 6A including a double-sided touch sensor panel and wrapping around multiple different edges of the touch sensor panel. The substrate of FIG. 6C can be formed of a flexible material such as CPI, COP, or PET. The flexibility provided by flexible materials can enable bending of the substrate (e.g., portions 606B/606B' of the substrate). In some examples, as shown in FIG. 6C, for example, the bending of portion 606B on a first side of the substrate can provide for 180 degrees of bending between substantially planar portions 606A and 606C of the substrate, and the bending of portion 606B' on a second side of the substrate (different from the first side of the substrate) can be provide for 180 degrees of bending between substantially planar portions 606A and 606C of the substrate. In some examples, the first side and the second side of the substrate at which bending occurs can be on opposite sides as illustrated in FIG. 6C (for simplicity of illustration). In some examples, the first side and the second side of the substrate at which bending occurs can be on adjacent sides. Although bending is illustrated at two sides of the substrate in FIG. 6C, it should be understood that the bending can occur at fewer or more sides of the substrate. Additionally, the bending described herein can occur along the entire side of the substrate (e.g., to reduce the border region around the touch screen) or only for a portion of the substrate (e.g., to reduce the border region proximate to another component (e.g., a camera or other sensor or circuitry).

The planar portion 606A can include touch electrodes 612 of the touch sensor panel and can be disposed above the display of the touch screen (e.g., the touch electrodes and/or planar portion 606A can be coterminous with the display). In double-sided touch sensor panels, the touch electrodes 612 can include electrodes on opposite sides of the substrate (e.g., in a row-column pattern, as described with respect to FIG. 6A). In some examples, the substrate can include a protective coating (e.g., hard coating 660) which can improve performance for bending of the substrate. In some examples, hard coating 660 may be replaced (or augmented) with a coating layer (not necessarily hard) to provide for improved adhesion and/or for chemical compatibility for deposition of touch electrodes. The planar portion 606A can also include one or more layers above touch electrodes 612 (e.g., on both sides of the substrate). In some examples, the one or more layers can include a passivation layer (e.g., corresponding to passivation layer 616) and adhesive layer (e.g., corresponding to adhesive layer 610) over touch electrodes 612 on both sides of the substrate. In some examples, to reduce the stack-up thickness, protective/adhesive layer 672 can be formed using a material with both adhesive and passivation properties such that the stack-up does not need to include both the adhesive layer (e.g., corresponding to adhesive layer 610) and a separate passivation layer (e.g., corresponding to passivation layer 616). The planar portion 606C can be disposed below the display of the touch screen (outside the visible area).

The flexible substrate can route the touch electrodes 612 of touch screen 600 to touch sensing circuitry below display 602. For example, the flexible substrate can include routing 644 on a first side of the flexible substrate to route touch electrodes 612 from one side of the touch sensor panel 620 to the touch sensing circuitry. Likewise, the flexible substrate can include routing 644' on a second side of the flexible substrate to route touch electrodes 612 from the second, opposite side of the touch sensor panel 620 to the touch sensing circuitry. As shown in FIG. 6C, the routing 644, 644' can be flexible and can be disposed on portions 606B, 606B' of the substrate. The routing 644, 644' can be electrically coupled to touch electrodes 612 at first interconnection interfaces (e.g., on two ends of portion 606A of the substrate). The routing 644, 644' can be electrically coupled to the touch sensing circuitry (not shown) via second interconnection interfaces (e.g., on portions 606C, 606C' of the substrate). In some examples, protective/adhesive layer 672 can extend from portion 606A to portions 606B, 606B', 606C, 606C' to provide protection from corrosion and/or provide mechanical stability for routing 644, 644' and the flexible substrate 606. In some examples, a separate protective coating (e.g., corresponding to protective coating 642 in FIG. 6B) can be included to prevent corrosion and/or to provide mechanical stability for routing 644, 644' and the flexible substrate 606.

Figure 7A:
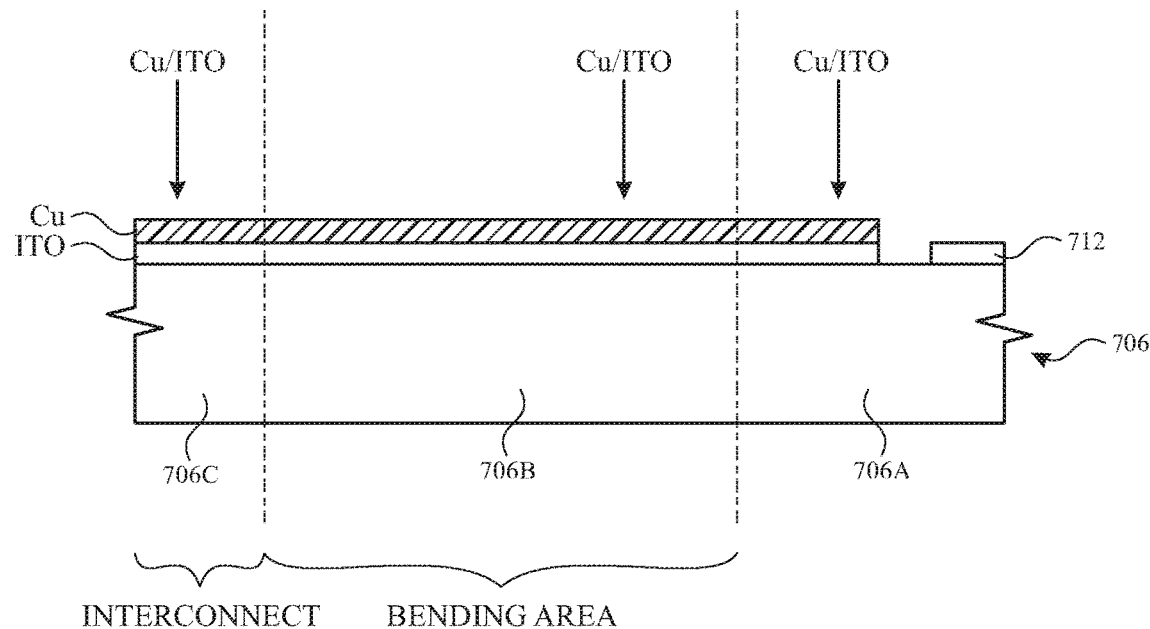
FIGS. 7A-7J illustrate examples of flexible substrates and routing according to examples of the disclosure.

As discussed above, the routing in the flexed portion 606B (bending area of portion 606B) of the substrate can be flexible for reliability. FIGS. 7A-7J illustrate examples of flexible substrates and routing according to examples of the disclosure. FIGS. 7A-7J illustrate a planar substrate 706 prior to bending. For simplicity of illustration and description, routing of one touch electrode (e.g., touch electrode 712) is shown, but it is understood that routing can be included for additional touch electrodes. FIG. 7A illustrates an example with touch electrodes 712 formed from ITO and with copper terminated ITO routing forming an extended bond pad across substrate 706 (from portion 706A to 706C) for an interconnect to touch sensing circuitry via the copper terminated bond pad. The touch electrode 712 can be connected the copper terminated ITO in portion 706A by a routing trace formed of ITO, for example.

Figure 7B:
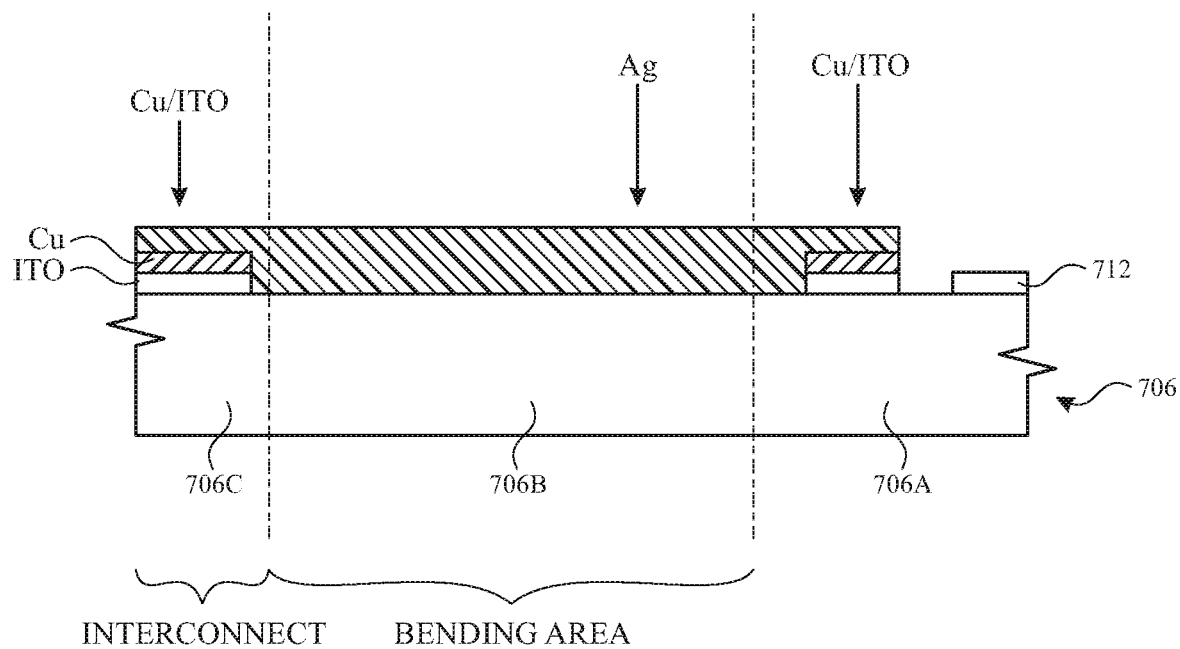
Figure 7C:
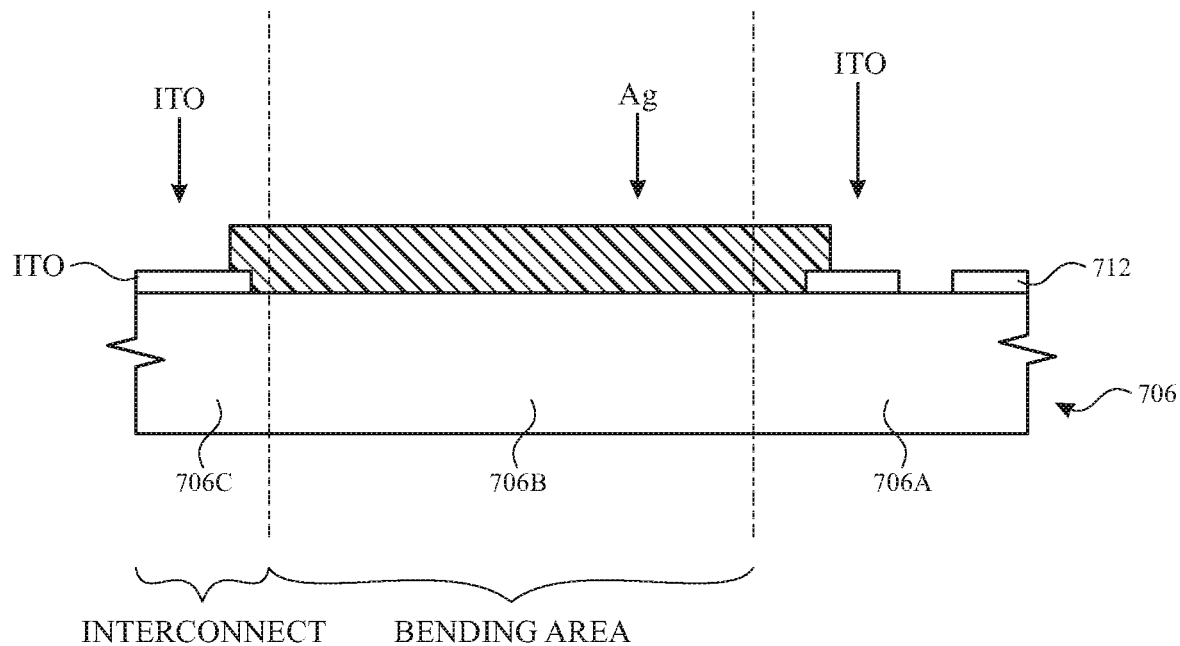
Figure 7D:
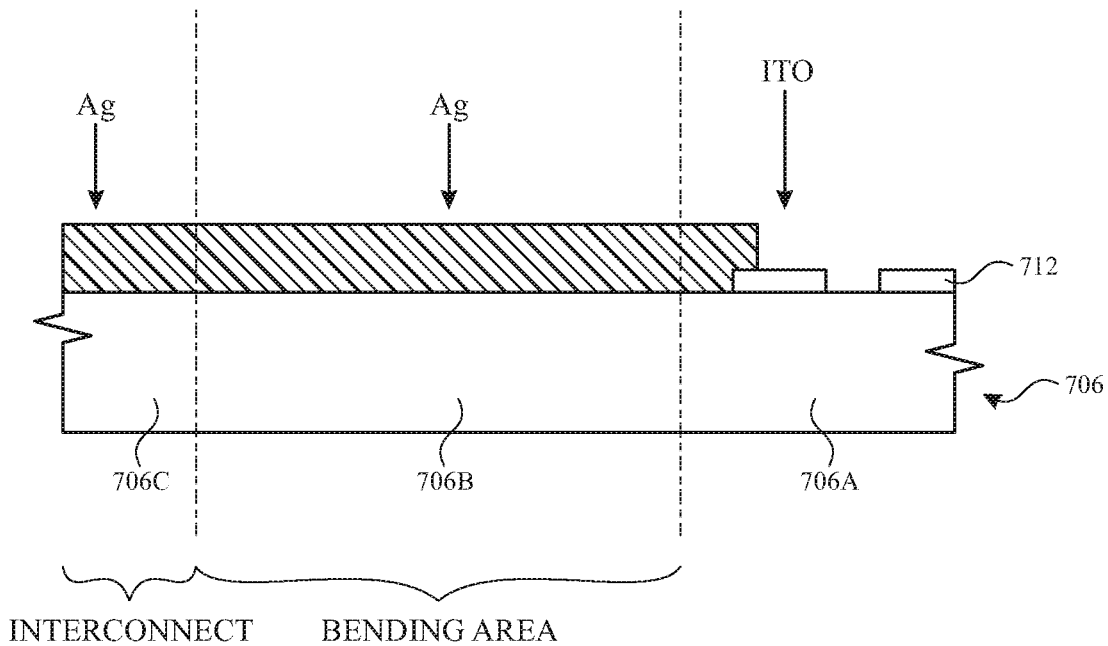

In some examples, the flexibility of routing can be improved by selecting materials with improved flexibility compared with ITO. For example, the copper terminated ITO in the bending area of portion 706B can be replaced with a flexible conductor, such as a silver (or copper) paste. FIG. 7B illustrates an example with a copper terminated ITO bond pad in portion 706C (and a copper terminated ITO bond pad in portion 706A that can be coupled to touch electrodes 712 in portion 706A by a routing trace formed of ITO, for example), but without the ITO (and copper) in the bending area of portion 706B. Instead, a silver paste can be used for routing in portion 706B. In some examples, copper can be omitted from the bond pads as well. For example, FIG. 7C illustrates an example with ITO bond pads without copper termination. In some examples, for example as illustrated in FIG. 7D, the silver paste can form the bond pads (without ITO and/or copper).

Figure 7E:
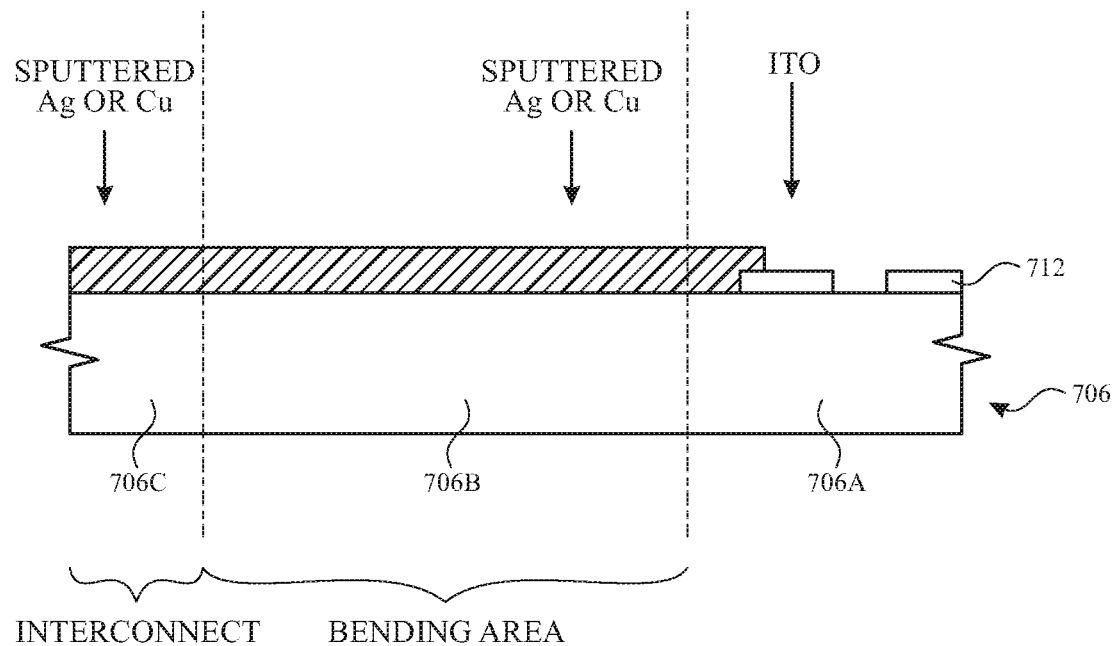

In some examples, as illustrated in FIG. 7E, rather than using a silver (or copper) paste, the routing from the touch electrodes 712 can be via sputtered copper or silver across substrate 706 (from portion 706A to 706C) for an interconnect to touch sensing circuitry via the sputtered copper or silver bond pad. In a similar manner as described above with respect to FIGS. 7A-7B, the touch electrode 712 formed of ITO can be connected the ITO in portion 706A by a routing trace formed of ITO, for example, in FIGS. 7C-7E.

Figure 7F:
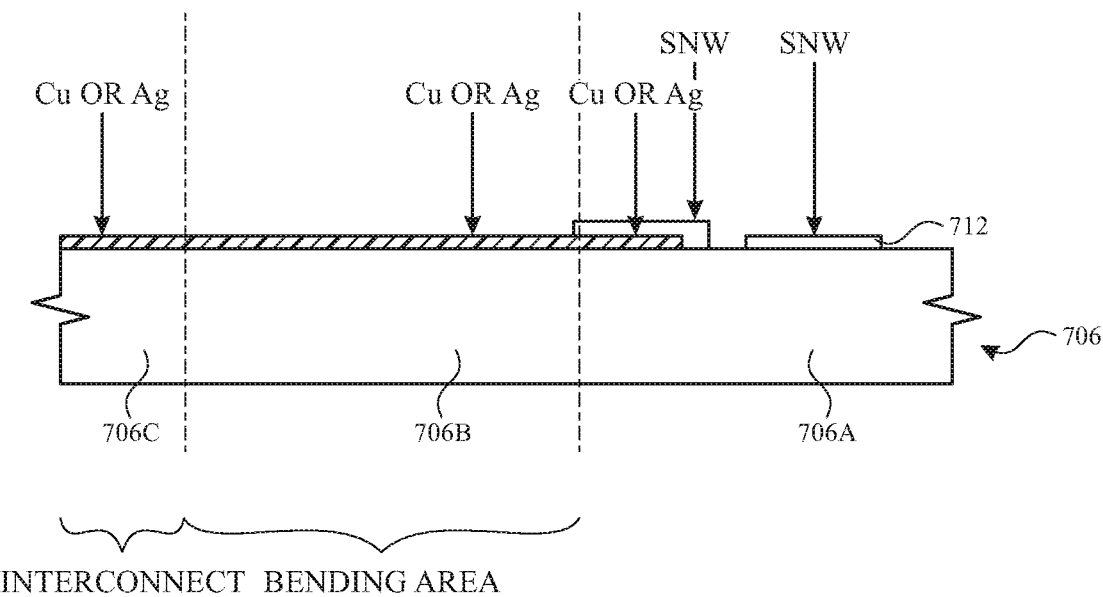
Figure 7G:
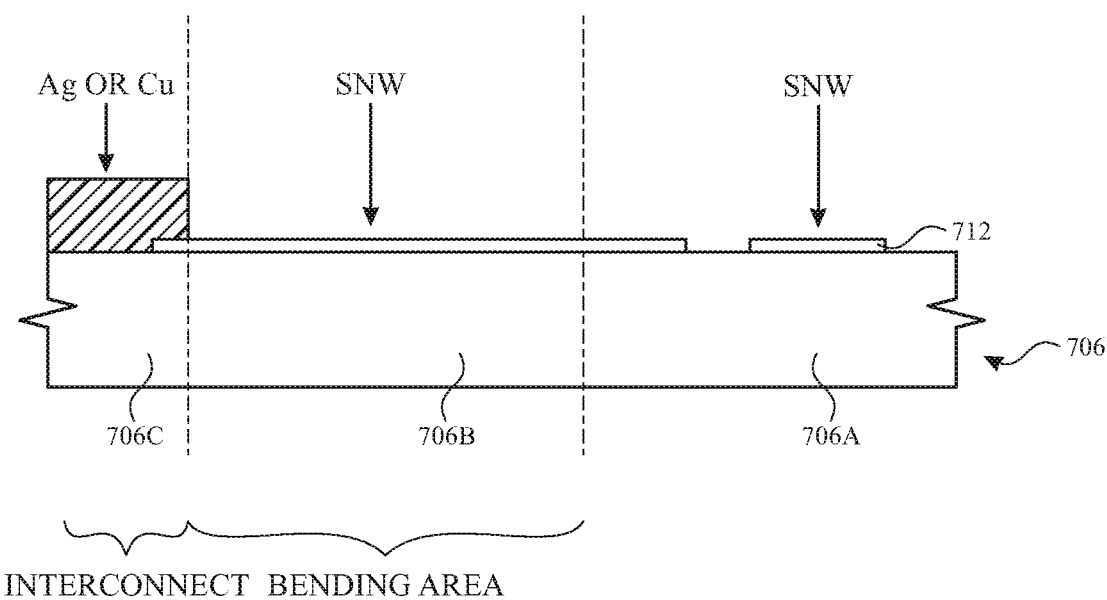
Figure 7H:
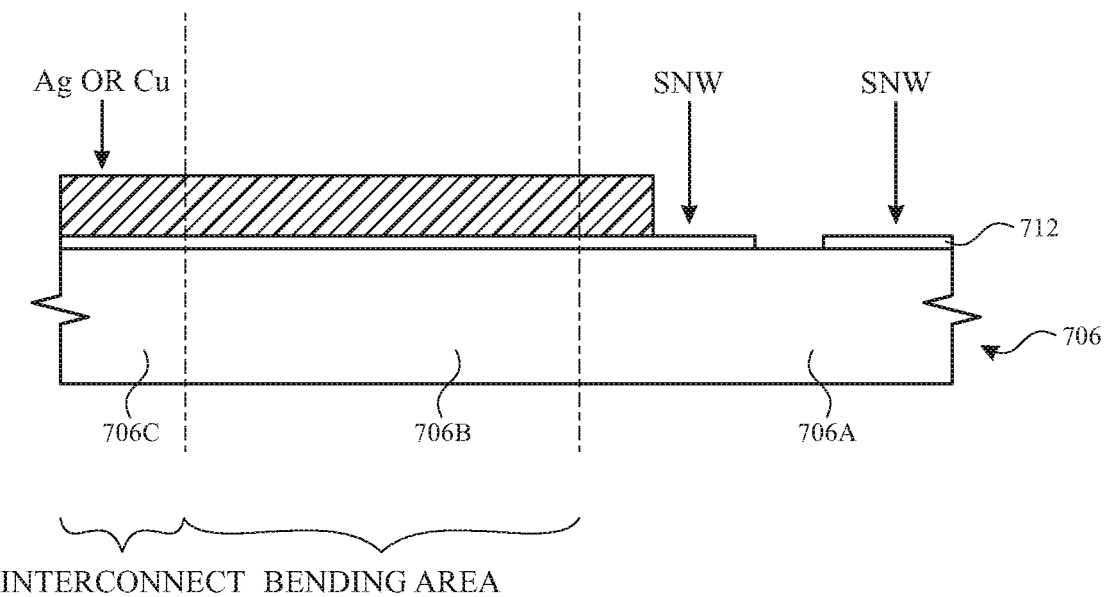

Although FIGS. 7A-7E refer to touch electrodes 712 formed from ITO, it should be understood that touch electrodes can be formed from other materials (e.g., silver nanowire). For example, FIGS. 7F-7J illustrate a flexible substrate 706 that can include touch electrodes 712 that can be formed of silver nanowire. The touch electrode 712 represented in FIGS. 7F-FJ can be connected to the silver nanowire material in portion 706A by a routing trace formed of silver nanowire, for example. In some examples, the silver nanowire touch electrodes can be routed via silver (or copper) paste (e.g., as described with respect to FIG. 7D). In some examples, the silver nanowire touch electrodes can be routed via copper or silver traces (e.g. sputtered silver or copper, or printed silver ink), as illustrated in FIG. 7F. The copper or silver can form the bond pads for interconnection in portion 706C. In some examples, silver nanowire can be used in portion 706B for flexible routing, as shown in FIG. 7G. Additionally or alternatively, as shown in FIG. 7G, the bond pad for interconnection in portion 706C can be formed of copper or a silver paste (or ink). In some examples, the silver nanowire in portions 706A-706C can be overlaid with silver paste or ink, as illustrated, for example in FIG. 7H (e.g., to improve the conductivity of the routing).

Figure 7I:
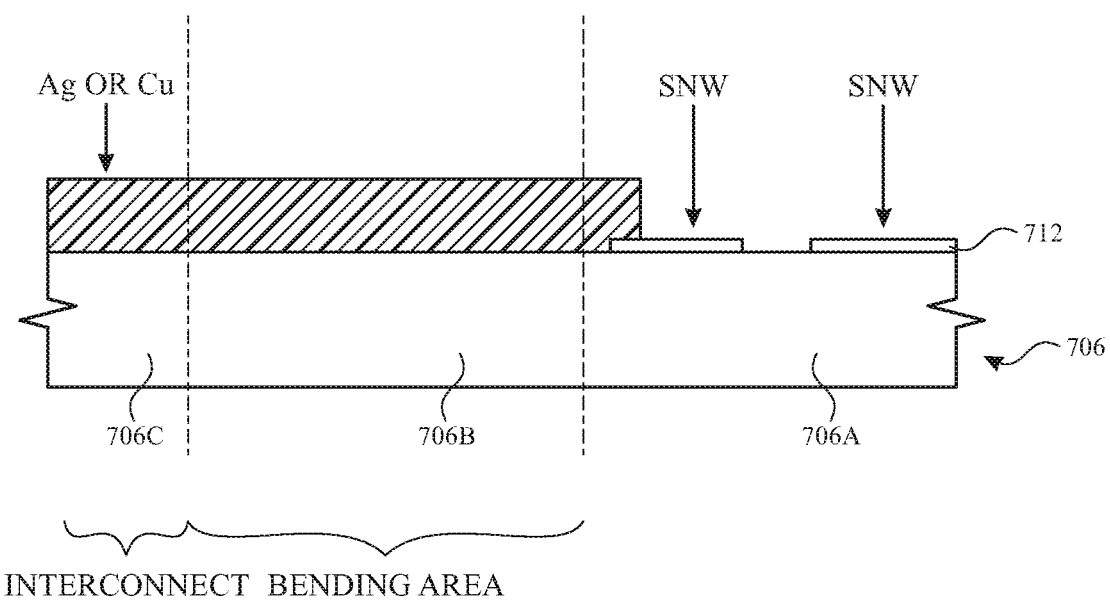
Figure 7J:
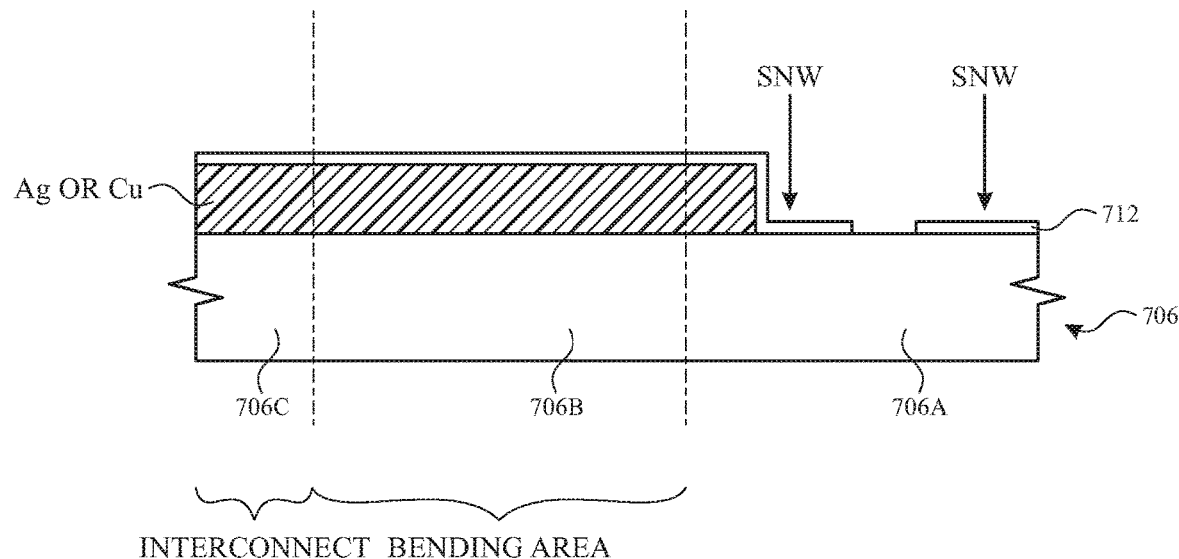

In some examples, the routing in the bending area (portion 706B) can be silver (or copper) paste or ink (or other sputtered silver or copper), as illustrated in FIG. 7I. Thus, FIG. 7I can be similar to FIGS. 7D-7E, but using a silver nanowire touch electrode rather than an ITO touch electrode. In some examples, the routing can be formed of both silver nanowire and silver paste (or ink or sputtered silver or copper) in portions 706A-706C, with the silver nanowire overlaying silver paste or ink as illustrated, for example, in FIG. 7J (as opposed to silver nanowire overlaid with silver paste or ink as in FIG. 7H).

It should be understood that FIGS. 7A-7J illustrate exemplary options for routing for a flexible substrate (and for touch electrodes and bond pads), but other materials and options can be implemented for flexible routing between the touch electrodes and touch sensing circuitry.

As described above, in some examples, the flexible substrate may not fully wrap-around from the touch sensor panel to touch sensing circuitry (e.g., disposed behind the display). In some examples, the touch screen may include a flexible substrate which extends, at least partially, beyond the visual area of the touch screen. For example, FIG. 6D shows a short flexible tab extending from the stack-up for connection to a flex circuit (and subsequently to the touch sensing circuitry, not shown). FIG. 6D illustrates touch screen 630 that can be similar to touch screen 600 of FIG. 6A, and some differences will be described below for ease of description. Unlike FIG. 6A with a flexible substrate 606 wrapping around from the touch sensor panel 620 to behind the display 602, in FIG. 6D the flexible substrate 606 can include a tab 606D extending from the stack-up and a flex circuit 650 coupled to tab 606D to route the touch electrodes 612 of touch sensor panel 620 to touch sensing circuitry. Connecting the flex circuit 650 to tab 606D outside of the stack-up can reduce the height of the stack-up relative to FIG. 5A where the flexible circuit is coupled within the stack-up. Although FIG. 6D shows one short flexible tab and one flex circuit, it should be understood that additional flexible tabs (and corresponding flex circuits) can be implemented on additional side of the substrate, in some examples.

Although primarily illustrated in FIG. 6A-6D as a planar touch screen, it should be understood that the flexible substrate described herein can also include touch electrodes and other flexible circuitry to enable curved, flexible or foldable touch sensors.

As mentioned above, in some examples, a touch screen stack-up can include a shield layer between the touch sensor panel and the display to reduce interference between the touch and display systems. The thickness of the touch screen stack-up including a shield layer can be reduced by routing the shield layer to a shield electrode on the touch sensor panel. The shield layer can then be routed to touch sensing circuitry (e.g., touch controller 206) via the flexible substrate. In some examples that use flex circuits rather than a flexible substrate, routing the shield layer to the touch sensing layer can reduce the number of flex circuits (or tabs), which can reduce the thickness of the stack-up.

Figure 8A:
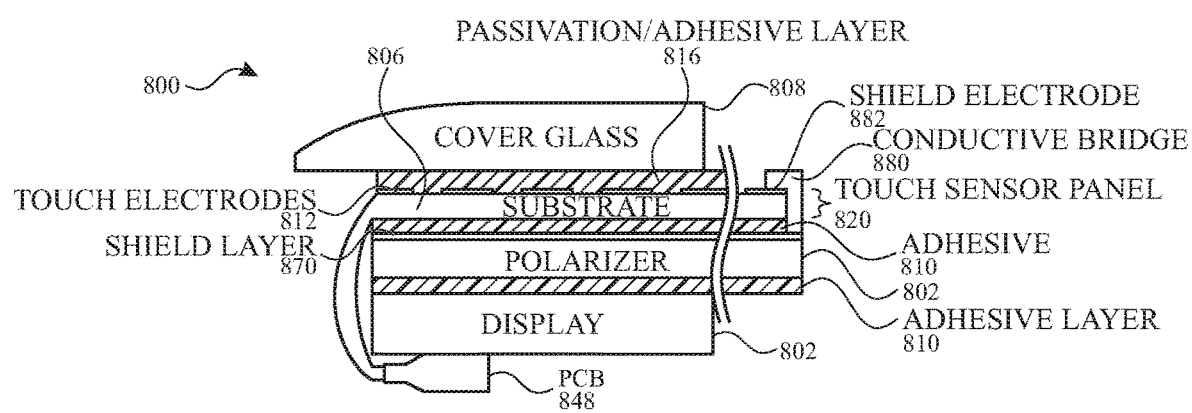
FIGS. 8A-8B illustrate an example of touch screen stack-up with a shield layer routed to the touch sensor panel examples of the disclosure.
Figure 8B:
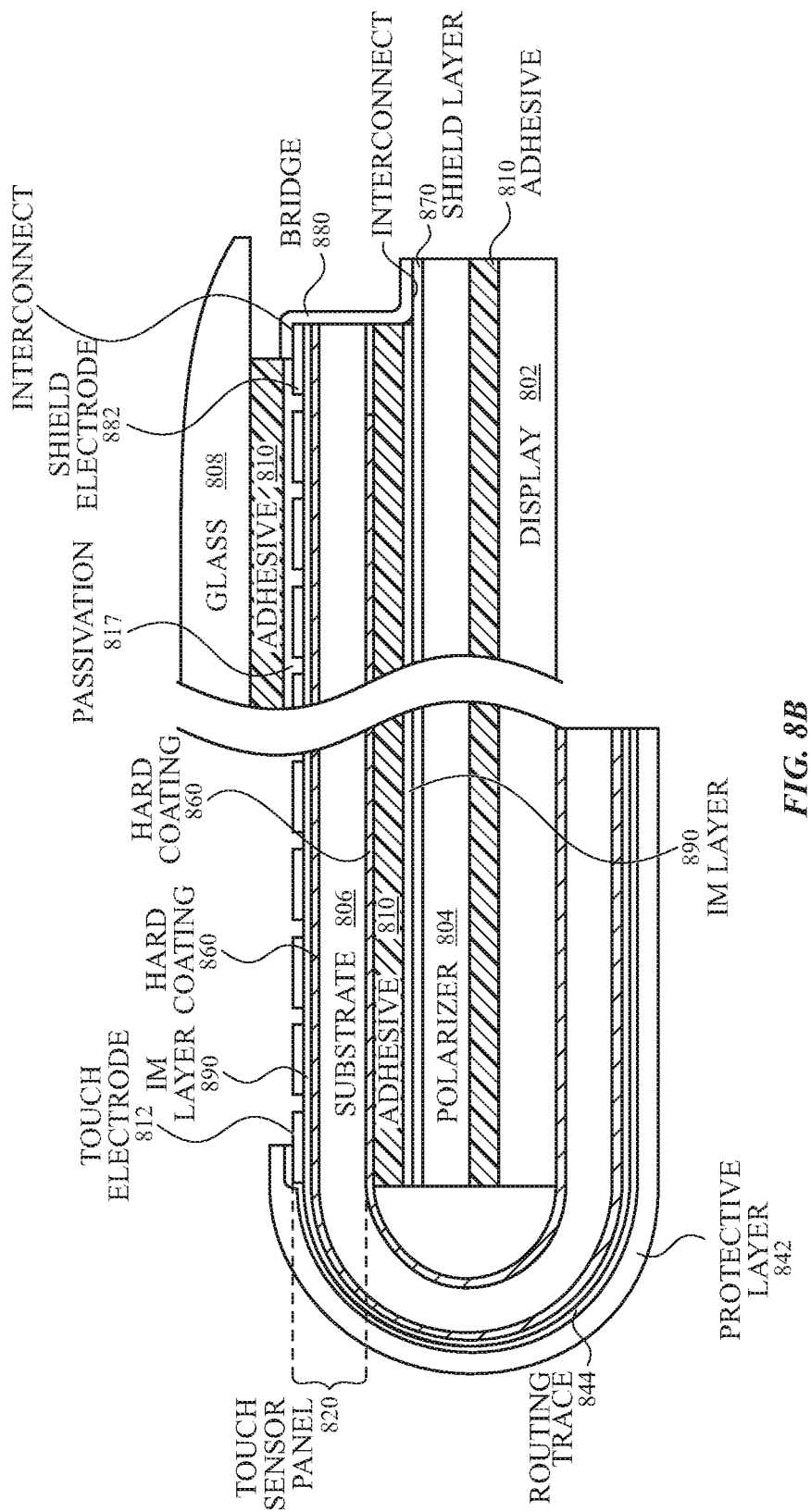

FIGS. 8A-8B illustrate an example of touch screen stack-up with a shield layer routed to the touch sensor panel examples of the disclosure. FIG. 8A illustrates touch screen 800 can include a display 802, a polarizer 804, a touch sensor panel 820 (e.g., including touch electrodes 812 patterned on one side of substrate 806, passivation/adhesive layer 816 disposed on substrate 806), a cover glass 608 and one or more adhesive layers 810. Touch screen 800 can be similar to touch screen 600, and some differences will be described below for ease of description. Unlike FIG. 6A, touch screen 800 can include a shield layer 870 between its touch sensor panel 820 (illustrated as a single-sided touch electrode pattern) and display 802 (and/or polarizer 804). In some examples, shield layer 870 can be formed of a partially or fully transparent material such as ITO, silver nanowire, etc. The shield layer 870 can reduce interference between the touch sensor panel 820 and the display 802.

The shield layer 870 can be separated from the touch electrodes 812 by at least substrate 806, such that the touch electrodes 812 can be disposed on a first side of substrate 806 and shield layer 870 can be disposed on a second side, opposite the first side. In some examples, the shield layer can be formed on the substrate 806 (on the second side for a one-sided touch electrode pattern). In some examples, the shield layer can be formed on a different substrate in the stack-up than substrate 806 upon which the touch electrodes 812 are formed. In such examples, the shield layer 870 can be further separated from touch sensor panel 820 by an adhesive layer. In some examples, the different substrate can be a substrate of polarizer 804. Using a substrate of polarizer 804 can reduce the thickness of the stack-up.

Touch screen 800 also includes a conductive bridge 880 to electrically couple the shield layer 870 from the second side of substrate 806 to the first side of substrate 806 of touch sensor panel 820. For example, a silver (or copper) paste can wrap around substrate 806 to the side of the substrate including the touch electrodes. It is understood that other suitable materials (e.g., conductive films, etc.) can be used to form a bridge between the shield layer 870 and the touch sensor panel 820. The conductive bridge 880 can connect to an electrode ("shield electrode") 882 on the first side of substrate 806 of touch sensor panel 820. In some examples, shield electrode 882 can be formed of ITO, though other materials are possible (e.g., silver nanowire, etc.). The shield electrode 882 can then be routed to touch sensing circuitry (e.g., to drive the shield with a voltage, such as the touch sensing stimulation voltage). For example, as shown in FIG. 8A, the wraparound of conductive bridge 880 can wrap around the edge of substrate 806, opposite the edge of the stack-up from which flexible substrate 806 extends. The shield layer 870, via conductive bridge 880 and shield electrode 882, can therefore be routed to the touch sensing circuitry via the flexible substrate to the touch sensing circuitry (e.g., on PCB 848). In some examples, the conductive bridge can be used in a stack-up that does not include a flexible substrate. Instead, the shield electrode can be routed to touch sensing circuitry via a flex circuit. Whether a flexible substrate or flex circuit is used, the conductive bridge 880 can reduce the thickness of the stack-up because a separate flex circuit does not need to be used to connect the shield layer to the touch sensing circuitry.

FIG. 8B illustrates another view of touch screen 800 including some additional details according to examples of the disclosure. For example, FIG. 8B illustrates additional details regarding the flexible substrate 806 of touch sensor panel 820 to enable connection of touch sensor panel 820 to touch sensing circuitry (not shown) without a flex connector. The planar portion of substrate 806 can include touch electrodes 812. The planar portion of substrate 806 can also include a passivation layer 817 (with separate adhesive layer 810, together corresponding to passivation/adhesive layer 816) above touch electrodes 612. In some examples, the substrate can include a protective coating (e.g., hard coating 860) which can improve performance for bending of the substrate. In some examples, hard coating 860 may be replaced (or augmented) with a coating layer (not necessarily hard) to provide for improved adhesion and/or for chemical compatibility for deposition of touch electrodes. An index matching layer can be disposed between hard coating 860 and conductive layers (e.g., touch electrodes 812, shield layer 870, shield electrode 882) for matching optical properties (e.g., to reduce the index of refraction change between two materials with different indexes of refraction). The flexible substrate 806 can also include routing 844 to route touch electrodes 812 from the touch sensor panel 820 to the touch sensing circuitry. Additionally, a protective coating 842 can be included to prevent corrosion and/or to provide mechanical stability for routing 844 and the flexible substrate 806.

Conductive bridge 880 can be coupled to shield layer 870 and shield electrode 882 as illustrated by interconnections. For example, on the side of the stack-up including conductive bridge 880, display 802, polarizer 804 and shield layer 882 can be wider than touch sensor panel 820 to enable the conductive bridge 880 to be bonded to shield layer 870 (e.g., within the stack-up). Conductive bridge 880 can then wrap around substrate 806 to a bond pad corresponding to shield electrode 882 on the opposite side of substrate 806 from shield layer 870.

Although FIGS. 8A-8B illustrate shield layer 870 disposed on top of polarizer 804, in some examples, the shield layer 870 can be disposed on a different layer of polarizer 804. For example, the shield layer could be disposed on the opposite side of polarizer 804 (e.g., between polarizer 804 and display 802). In such a case, the polarizer can be narrowed within the stack-up to enable conductive bridge 880 to be bonded to shield layer 870. In some examples, shield layer 870 can be disposed on display 802 and coupled to driving circuitry via a flex circuit for display 802 (not shown).

Additionally, or alternatively, in some examples, as described herein, the touch sensor panel or a portion of thereof can be integrated with polarizer. Integrating the touch sensor panel with the polarizer can reduce the thickness of the touch screen stack-up because fewer substrates can be used.

Figure 9:
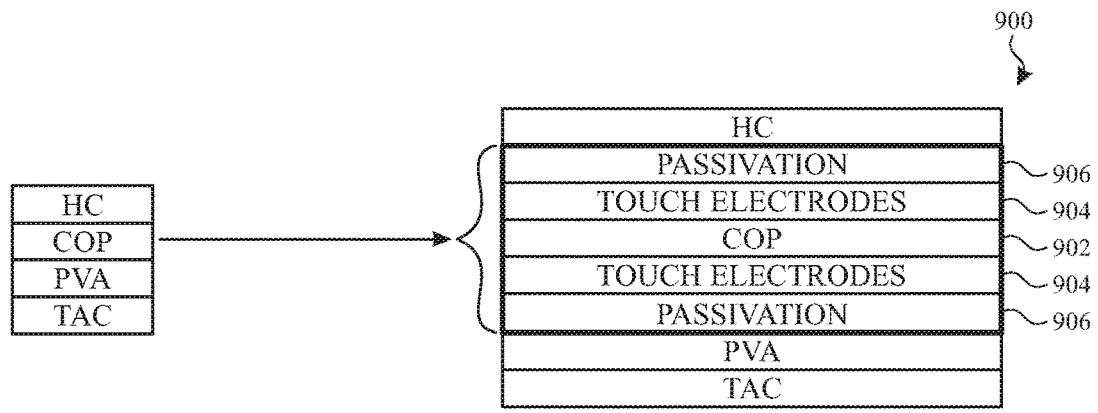
FIGS. 9 and 10 illustrate examples of an integrated touch sensor panel and polarizer according to examples of the disclosure.
Figure 10:
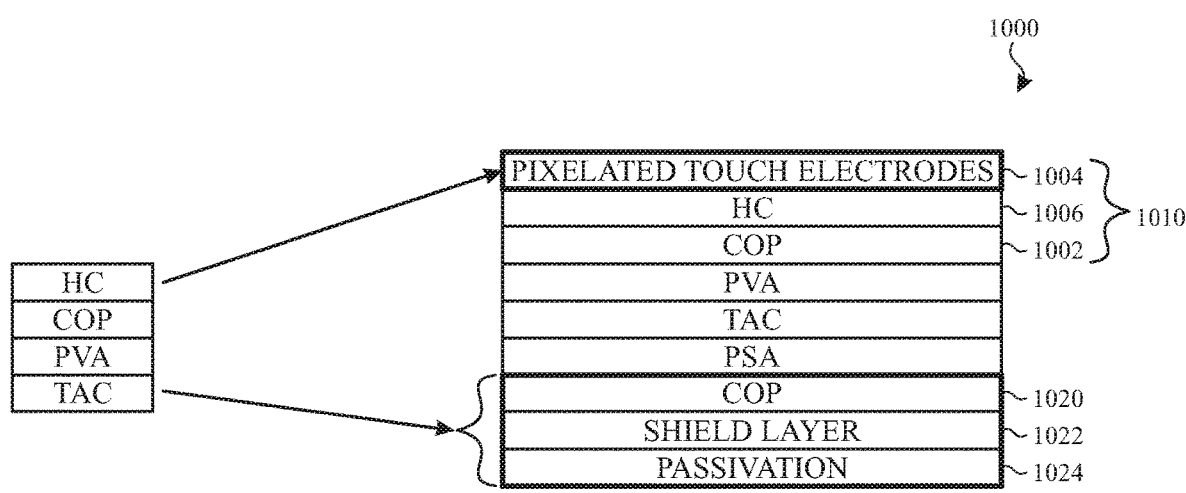

FIGS. 9 and 10 illustrate examples of an integrated touch sensor panel and polarizer according to examples of the disclosure. FIG. 9 illustrates an integrated touch sensor panel and polarizer 900 in which a double-sided touch sensor panel 910 is formed using the polarizer substrate according to examples of the disclosure. An example polarizer (e.g., corresponding to polarizer 504 from FIG. 5B) without an integrated touch sensor panel is reproduced on the left-hand side of FIG. 9, which includes a substrate (labeled "COP"). In some examples, the same substrate can be shared by the touch sensor panel 910 and the polarizer layers for an integrated touch sensor panel and polarizer 900. For example, as illustrated in FIG. 9, prior to forming the polarizer layers (e.g., PVA film, TAC, etc.) on the substrate, touch electrodes 904 can be disposed on both sides of substrate 902. Although touch electrodes 904 are shown on both sides of substrate 902, it should be understood that in some examples the touch electrodes can be disposed on one side of the substrate (e.g., for a pixelated touch electrode pattern shown in FIG. 4B or a single-sided row-column touch electrode pattern using bridges). Touch electrodes 904 can be formed from ITO, or other suitable materials (e.g., silver nanowire, etc.). A passivation layer 906 can be disposed on touch electrodes 904. Forming the touch electrodes on the substrate prior to forming the polarizer layers can enable high-temperature processing steps for touch electrodes (e.g., for ITO deposition and annealing) that may damage polarizer layers. After forming sensor panel 910, the remaining polarizer layers (e.g., hard coat, PVA film, TAC layer, etc.) can be formed on touch sensor panel 910 to form integrated touch sensor panel and polarizer 900.

FIG. 10 illustrates an integrated touch sensor panel and polarizer 1000 in which a single-sided touch sensor panel 1010 is formed using the polarizer substrate according to examples of the disclosure. An example polarizer (e.g., corresponding to polarizer 504 from FIG. 5B) without an integrated touch sensor panel is reproduced on the left-hand side of FIG. 10, which includes a substrate (labeled "COP"). In some examples, the same substrate can be shared by the touch sensor panel 1010 and the polarizer layers for an integrated touch sensor panel and polarizer 1000. For example, as illustrated in FIG. 10, before or after forming the polarizer layers (e.g., PVA film, TAC, etc.) on the substrate, touch electrodes 1004 can be disposed on the hard coat layer 1008 on substrate 1002. Touch electrodes 1004 can be formed from ITO, or other suitable materials (e.g., silver nanowire, etc.). Although not shown in FIG. 10, in some examples, a passivation layer can be disposed on touch electrodes 1004.

Additionally, in some examples, integrated touch sensor panel and polarizer 1000 can include a shield layer 1022. The shield layer can be formed of ITO or other suitable materials (e.g., silver nanowire), and can be formed on a second substrate 1020, which can serve as the bottom substrate of integrated touch sensor panel and polarizer 1000. In some examples, a passivation layer 1024 can be disposed on shield layer 1022. In some examples, the shield layer 1022 can be coupled to the layer including touch electrodes 1004 via a conductive bridge (e.g., as described above with respect to shield layer 870, conductive bridge 880, and shield electrode 882). Substrate 1020, shield layer 1022 and passivation layer 1024 can be coupled (e.g., via adhesive, lamination) to the rest of integrated touch sensor panel and polarizer 1000.

In some examples, forming the touch electrodes on the substrate/hard coat prior to forming the polarizer layers can enable high-temperature processing steps for touch electrodes (e.g., for ITO deposition and annealing) that may damage polarizer layers. After forming sensor panel 1010, the remaining polarizer layers (e.g., PVA film, TAC layer, etc.) can be formed on touch sensor panel 1010 to form integrated touch sensor panel and polarizer 1000. In some examples, the touch electrodes can be formed on the substrate/hard coat after forming the polarizer layers using lower-temperature processing steps for touch electrodes (e.g., silver nanowire) that may be performed without damaging polarizer layers.

Figure 11:
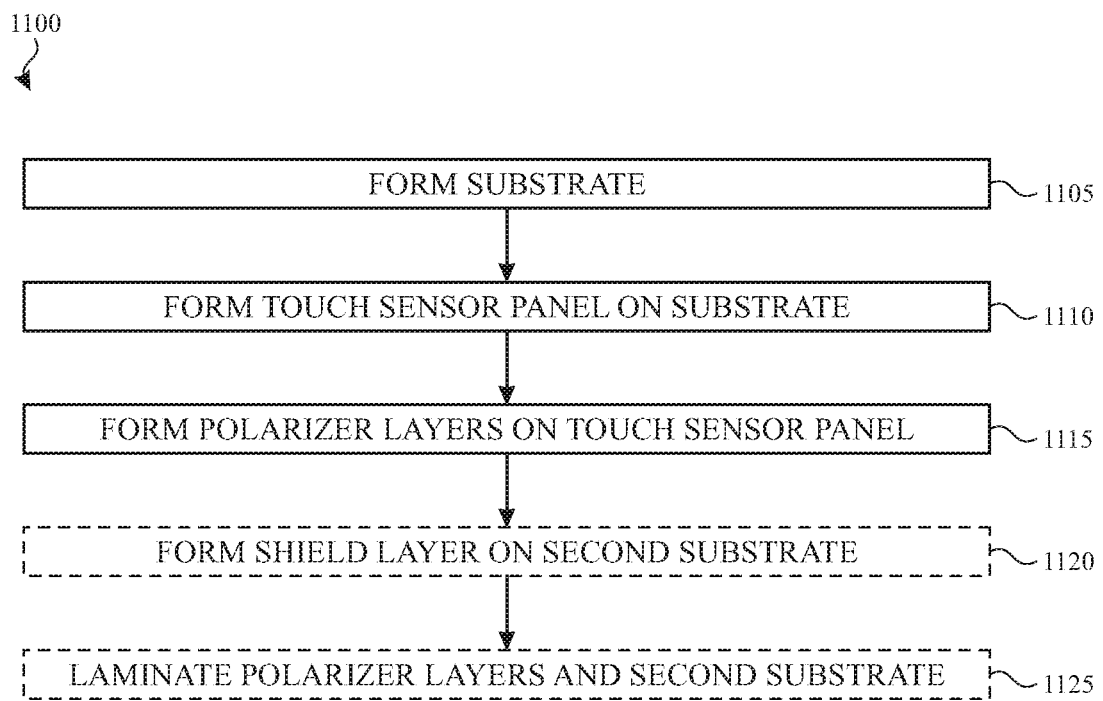
FIG. 11 illustrates an exemplary process for forming an integrated touch sensor panel and polarizer according to examples of the disclosure.

FIG. 11 illustrates an exemplary process 1100 for forming an integrated touch sensor panel and polarizer according to examples of the disclosure. At 1105, a first substrate can be formed. The first substrate can be formed from a glass or a transparent polymer (e.g., COP). At 1110, a touch sensor panel can be formed on the substrate. For example, as described above with respect to FIG. 9, touch electrodes can be deposited on one or both sides of the substrate to form the touch sensor panel 910. In some examples, the touch electrodes can be formed of ITO via deposition and annealing. Additionally, in some examples, a passivation layer can be deposited over the touch electrodes to protect the touch electrodes and/or to planarize the touch sensor panel. At 1115, the polarizer layers can be formed on the touch sensor panel. For example, the polarizer layers can include, as described herein, one or more hard coat layers, one or more adhesive layers, one or more optical retarder layers (e.g., HWP, QWP), a polyvinyl alcohol layer (e.g., PVA film layer), and a tri-acetyl cellulose layer. In some examples, the integrated touch sensor panel and polarizer can include a shield layer to reduce interference between the touch sensor panel and the display. For example, at 1120, the shield layer can be formed on a second substrate. The shield layer can be formed of ITO or other suitable materials (e.g., silver nanowire). A passivation layer can be disposed on the shield layer as well. At 1125, the second substrate (and the shield layer) can be coupled to the polarizer layers (e.g., via an adhesive layer and lamination process).

It should be understood that FIG. 11 describes an example process for forming an integrated touch sensor panel and polarizer according to examples of the disclosure. For example, the integrated touch sensor panel and polarizer of FIG. 11 can be formed without the shield layer (omitting 1120 and 1125). In some examples, touch electrodes can be formed on one side of the substrate at 1110, and additional touch electrodes can be formed on one side of a second substrate. The second substrate and touch electrodes can be coupled instead of the shield layer at 1125. In some examples, the touch sensor panel may include touch electrodes formed on only one side (e.g., pixelated touch electrodes). In such examples, the touch electrodes can be formed on the hard coat of the substrate. In some examples, the polarizer can first be formed on the substrate and subsequently the touch electrodes can be formed on the polarizer (e.g., as described above with respect to FIG. 10).

Therefore, according to the above, some examples of the disclosure are directed to a touch screen comprising: a display and a touch sensor panel disposed on the display. The touch sensor panel can comprise a substrate formed from a flexible material and touch electrodes formed on one or more surfaces of the substrate. A first portion of the substrate including the touch electrodes can be planar and a second portion of the substrate can be non-planar such that the substrate extends beyond a dimension of the display. Additionally or alternatively to one or more of the examples disclosed above, in some examples, the second portion of the substrate can be a tab. Additionally or alternatively to one or more of the examples disclosed above, in some examples, the second portion of the substrate can wrap around from the touch sensor panel to a different layer in the touch screen. The different layer can be separated from the touch sensor panel by the display. Additionally or alternatively to one or more of the examples disclosed above, in some examples, the touch screen can further comprise a flex circuit coupled to the second portion of the substrate outside the dimensions of the display. Additionally or alternatively to one or more of the examples disclosed above, in some examples, the touch screen can further comprise conductive traces disposed on the second portion of the substrate configured to route the touch electrodes disposed on the first portion of the substrate to touch sensing circuitry. Additionally or alternatively to one or more of the examples disclosed above, in some examples, the conductive traces disposed on the second portion of the substrate can comprise first conductive traces disposed on a first side of the substrate in the second portion of the substrate and second conductive traces disposed on a second side of the substrate in the second portion of the substrate. Additionally or alternatively to one or more of the examples disclosed above, in some examples, the first conductive traces can be disposed between an inner coating layer disposed on the first side of the substrate and an outer coating layer disposed over the first conductive traces. Additionally or alternatively to one or more of the examples disclosed above, in some examples, the second conductive traces can be disposed between an inner coating layer disposed on the second side of the substrate and an outer coating layer disposed over the second conductive traces. Additionally or alternatively to one or more of the examples disclosed above, in some examples, the touch electrodes can be formed from indium tin oxide and the conductive traces disposed on the second portion of the substrate can be formed without indium tin oxide. Additionally or alternatively to one or more of the examples disclosed above, in some examples, the touch electrodes can be formed from silver nanowire and the conductive traces disposed on the second portion of the substrate can be formed from silver nanowire. Additionally or alternatively to one or more of the examples disclosed above, in some examples, the first portion of the substrate can be coterminous with the display. Additionally or alternatively to one or more of the examples disclosed above, in some examples, a third portion of the substrate can be planar and separated from the first portion of the substrate by the display. Additionally or alternatively to one or more of the examples disclosed above, in some examples, the touch screen can further comprise a bonding pad disposed on the third portion of the substrate. Additionally or alternatively to one or more of the examples disclosed above, in some examples, the touch screen can further comprise a coating layer disposed on the one or more surfaces of the substrate. The touch electrodes formed on the one or more surfaces of the substrate can be disposed on the coating layer. Additionally or alternatively to one or more of the examples disclosed above, in some examples, the touch screen can further comprise a protective layer disposed on the one or more surfaces of the substrate. The touch electrodes can be formed on the one or more surfaces of the substrate can be disposed on the protective layer. Additionally or alternatively to one or more of the examples disclosed above, in some examples, the second portion of the substrate can be separated from the display such that a gap can be formed between the second portion of the substrate and the display. Additionally or alternatively to one or more of the examples disclosed above, in some examples, the substrate can wrap around from the touch sensor panel to a different layer in the touch screen on a first side of the touch screen without the substrate wrapping around to the different layer in the touch screen on a second side of the touch screen different than the first side of the touch screen. Additionally or alternatively to one or more of the examples disclosed above, in some examples, a fourth portion of the substrate (e.g., 606B′) can be non-planar such that the substrate can extend beyond a second dimension of the display different than the first dimension of the display. Additionally or alternatively to one or more of the examples disclosed above, in some examples, the fourth portion of the substrate can wrap around from the touch sensor panel to the different layer in the touch screen. Additionally or alternatively to one or more of the examples disclosed above, in some examples, the touch screen can further comprise first conductive traces disposed on a first side of the substrate in the second portion of the substrate and second conductive traces disposed on a second side of the substrate opposite the first side of the substrate in the fourth portion of the substrate. Additionally or alternatively to one or more of the examples disclosed above, in some examples, the first conductive traces can be configured to route first touch electrodes of the touch electrodes on a first side of the substrate to touch sensing circuitry and the second conductive traces can be configured to route second touch electrodes of the touch electrodes on a second side of the substrate to the touch sensing circuitry.

Some examples of the disclosure are directed to a touch screen comprising a touch sensor panel, a shield layer and conductive routing. The touch sensor panel can comprise a first substrate and touch electrodes formed on a first surface of the first substrate. The first substrate can separate the touch electrodes from the shield layer. The conductive routing can be configured to route the shield layer around a first edge of the first substrate to the first side of the first substrate. Additionally or alternatively to one or more of the examples disclosed above, in some examples, the shield layer can be disposed on a second substrate different from the first substrate. Additionally or alternatively to one or more of the examples disclosed above, in some examples, the touch screen can further comprise a polarizer comprising the second substrate. Additionally or alternatively to one or more of the examples disclosed above, in some examples, the polarizer can further comprise the first substrate. Additionally or alternatively to one or more of the examples disclosed above, in some examples, the touch screen can further comprise an adhesive layer disposed between the touch sensor panel and the shield layer. Additionally or alternatively to one or more of the examples disclosed above, in some examples, the touch screen can further comprise an index matching layer disposed between the touch sensor panel and the shield layer. Additionally or alternatively to one or more of the examples disclosed above, in some examples, the shield layer can be disposed on a second side of the first substrate. Additionally or alternatively to one or more of the examples disclosed above, in some examples, the shield layer can comprise indium tin oxide or silver nanowire. Additionally or alternatively to one or more of the examples disclosed above, in some examples, the conductive routing can comprise silver paste. Additionally or alternatively to one or more of the examples disclosed above, in some examples, the touch sensor panel can further comprise: a shield electrode on the first side of the first substrate separate from the touch electrodes. The conductive routing can electrically couple the shield layer to the electrode on the first side of the first substrate. Additionally or alternatively to one or more of the examples disclosed above, in some examples, the shield electrode can comprise indium tin oxide or silver nanowire. Additionally or alternatively to one or more of the examples disclosed above, in some examples, the touch screen can further comprise a flexible connector disposed on a second edge of the first substrate. The flexible connector can be configured to route the touch electrodes and the shield layer from the first side of the first substrate to touch sensing circuitry. Additionally or alternatively to one or more of the examples disclosed above, in some examples, the shield layer can extend beyond the first edge of the first substrate such that the conductive routing can be disposed on the shield layer without extending beyond a length of a display of the touch screen.

Some examples of the disclosure are directed to a touch screen. The touch screen can be prepared by a process comprising: forming a substrate; forming a touch sensor panel on the substrate; and forming polarizer layers on the touch sensor panel. Additionally or alternatively to one or more of the examples disclosed above, in some examples, the substrate can have a thickness less than 50 µm. Additionally or alternatively to one or more of the examples disclosed above, in some examples, forming the touch sensor panel on the substrate can comprise depositing touch electrodes on both sides of the substrate. Additionally or alternatively to one or more of the examples disclosed above, in some examples, forming the touch sensor panel on the substrate can comprise depositing a passivation layer over the touch electrodes. Additionally or alternatively to one or more of the examples disclosed above, in some examples, the substrate can be formed from a transparent polymer and the touch electrodes are formed from indium tin oxide. Additionally or alternatively to one or more of the examples disclosed above, in some examples, the polarizer layers can include a polyvinyl alcohol layer, a tri-acetyl cellulose layer, and one or more optical retarder layers. Additionally or alternatively to one or more of the examples disclosed above, in some examples, the process can further comprise forming a shield layer on a second substrate; and coupling the second substrate to the polarizer layers. Additionally or alternatively to one or more of the examples disclosed above, in some examples, each of the substrate and the second substrate can have a thickness of 25 µm or less. Additionally or alternatively to one or more of the examples disclosed above, in some examples, the shield layer can be formed from indium tin oxide or silver nanowire. Additionally or alternatively to one or more of the examples disclosed above, in some examples, the second substrate can be coupled to the polarizer layers via an adhesive layer and lamination.

Some examples of the disclosure are directed to a method of forming a touch screen. The method can comprise forming a substrate; forming a touch sensor panel on the substrate; and forming polarizer layers on the touch sensor panel.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A touch screen comprising:
  a display;
  a touch sensor panel disposed on the display, the touch sensor panel comprising:
    a substrate formed from a flexible material, the substrate including one or more surfaces including a first surface and a second surface opposite the first surface;
    a first coating layer disposed on the first surface of the substrate; and touch electrodes including first touch electrodes disposed on the first coating layer on the first surface of the substrate, wherein the first touch electrodes are separated from the first surface of the substrate by the first coating layer;
    wherein a first portion of the substrate including the touch electrodes is planar and a second portion of the substrate is non-planar such that the substrate extends beyond a first dimension of the display and conductive traces disposed on the second portion of the substrate configured to route the touch electrodes disposed on the first portion of the substrate to touch sensing circuitry.

2. The touch screen of claim 1, wherein the second portion of the substrate is a tab.

3. The touch screen of claim 1, wherein the second portion of the substrate wraps around from the touch sensor panel to a different layer in the touch screen, the different layer separated from the touch sensor panel by the display.

4. The touch screen of claim 1, further comprising: a flex circuit coupled to the second portion of the substrate outside dimensions of the display.

5. The touch screen of claim 1, wherein the conductive traces disposed on the second portion of the substrate comprise first conductive traces disposed on a first side of the substrate in the second portion of the substrate and second conductive traces disposed on a second side of the substrate in the second portion of the substrate.

6. The touch screen of claim 5, wherein the first conductive traces are disposed between the first coating layer forming an inner coating layer and an outer coating layer disposed over the first conductive traces.

7. The touch screen of claim 5, wherein the second conductive traces are disposed between an inner coating layer disposed on the second side of the substrate and an outer coating layer disposed over the second conductive traces.

8. The touch screen of claim 1, wherein the touch electrodes are formed from indium tin oxide and the conductive traces disposed on the second portion of the substrate are formed without indium tin oxide.

9. The touch screen of claim 1, wherein the touch electrodes are formed from silver nanowire and the conductive traces disposed on the second portion of the substrate are formed from silver nanowire.

10. The touch screen of claim 1, wherein the first portion of the substrate is coterminous with the display.

11. The touch screen of claim 1, wherein a third portion of the substrate is planar and separated from the first portion of the substrate by the display.

12. The touch screen of claim 1, wherein: the first coating layer further comprises a protective layer; and the touch electrodes formed on the first coating layer of the substrate are disposed on the protective layer.

13. The touch screen of claim 1, wherein the second portion of the substrate is separated from the display such that a gap is formed between the second portion of the substrate and the display.

14. The touch screen of claim 1, wherein the substrate wraps around from the touch sensor panel to a different layer in the touch screen on a first side of the touch screen without the substrate wrapping around to the different layer in the touch screen on a second side of the touch screen, different than the first side of the touch screen.

15. The touch screen of claim 1, wherein a fourth portion of the substrate is non-planar such that the substrate extends beyond a second dimension of the display different than the first dimension of the display.

16. The touch screen of claim 15, wherein the fourth portion of the substrate wraps around from the touch sensor panel to a different layer in the touch screen, the different layer separated from the touch sensor panel by the display.

17. The touch screen of claim 15, further comprising first conductive traces disposed on a first side of the substrate in the second portion of the substrate and second conductive traces disposed on a second side of the substrate opposite the first side of the substrate in the fourth portion of the substrate.

18. The touch screen of claim 17, wherein the first conductive traces are configured to route first touch electrodes of the touch electrodes on the first side of the substrate to touch sensing circuitry and wherein the second conductive traces are configured to route second touch electrodes of the touch electrodes on a second side of the substrate to the touch sensing circuitry.

19. A touch screen comprising: a display; and a touch sensor panel disposed on the display, the touch sensor panel comprising: a substrate formed from a flexible material, the substrate including a first surface and a second surface opposite the first surface; a first coating layer disposed on the first surface of the substrate; a second coating layer disposed on the second surface of the substrate; and a plurality of first touch electrodes disposed on the first coating layer on the first surface of the substrate and a plurality of second touch electrodes disposed on the second coating layer on the second surface of the substrate, wherein the first touch electrodes are separated from the first surface of the substrate by the first coating layer and wherein the second touch electrodes are separated from the second surface of the substrate by the second coating layer; wherein a first portion of the substrate including the plurality of first touch electrodes and the plurality of second touch electrodes is planar and second portions of the substrate are non-planar and wrap around to a different layer in the touch screen, the different layer separated from the touch sensor panel by the display.

20. The touch screen of claim 1, further comprising: a cover substrate disposed on the touch sensor panel.

* * * * *